US012799306B2

(12) United States Patent
Cao et al.

(10) Patent No.: US 12,799,306 B2
(45) Date of Patent: Nov. 17, 2026

(54) POLYMER-COATED NANOPARTICLES, COMPOSITE NANO- EMULSION AND MACRO-EMULSION

(71) Applicants: Institute of Geology and Geophysics, Chinese Academy of Sciences, Beijing (CN); UTI LIMITED PARTNERSHIP, Calgary (CA)

(72) Inventors: Changqian Cao, Beijing (CN); Steven L. Bryant, Calgary (CA)

(73) Assignees: Institute of Geology and Geophysics, Chinese Academy of Sciences, Beijing (CN); UTI LIMITED PARTNERSHIP, Calgary (CA)

( * ) Notice: Subject to any disclaimer, the term of this patent is extended or adjusted under 35 U.S.C. 154(b) by 612 days.

(21) Appl. No.: 18/264,419

(22) PCT Filed: Jan. 12, 2022

(86) PCT No.: PCT/CN2022/071489

§ 371 (c)(1),
(2) Date: Aug. 5, 2023

(87) PCT Pub. No.: WO2022/166545

PCT Pub. Date: Aug. 11, 2022

(65) Prior Publication Data

US 2024/0093005 A1 Mar. 21, 2024

(30) Foreign Application Priority Data

Feb. 7, 2021 (CN) ........................ 202110167224.1

(51) Int. Cl.
*C08K 9/08* (2006.01)
*C08J 3/03* (2006.01)

(52) U.S. Cl.
CPC *C08K 9/08* (2013.01); *C08J 3/03* (2013.01); *C08K 2201/011* (2013.01)

(58) Field of Classification Search
CPC .................................... C08K 9/08; C08J 3/03
USPC .......................................................... 524/561
See application file for complete search history.

(56) References Cited

U.S. PATENT DOCUMENTS 8,035,763 B2 10/2011 Im
8,092,835 B1 1/2012 Wu et al.
8,357,639 B2 1/2013 Quintero et al.
2008/0025070 A1 1/2008 Horii et al.
2010/0035047 A1 2/2010 Ajayan et al.
2012/0201760 A1 8/2012 Tromsdorf et al.
2014/0212575 A1* 7/2014 Zhang .................. C07D 487/18
540/472

FOREIGN PATENT DOCUMENTS

CN 102115746 A 7/2011
CN 102464715 A 5/2012
CN 110272500 A 9/2019
CN 110819651 A 2/2020
WO WO-2017199832 A1 * 11/2017 .............. B22F 1/147

OTHER PUBLICATIONS

Yoon, Ki Youl et al.; "Stabilization of Superparamagnetic Iron Oxide Nanoclusters in Concentrated Brine with Cross-Linked Polymer Shells"; ACS Publications, Langmuir; vol. 27; Jul. 5, 2011; pp. 10962-10969.
Bagaria, Hitesh G. et al.; "Stabilization of Iron Oxide Nanoparticles in High Sodium and Calcium Brine at High Temperatures with Adsorbed Sulfonated Copolymers"; ACS Publications, Langmuir; vol. 29; Feb. 1, 2013; pp. 3195-3206.
Iqbal, Muhammad et al.; "High temperature stability and low adsorption of sub-100 nmmagnetite nanoparticles grafted with sulfonated copolymers on Bereasandstone in high salinity brine"; Colloids and Surfaces A: Physicochem. Eng. Aspects, vol. 520, Jan. 2017; pp. 257-267.
Nourafkan, EhsanNourafkan et al.; "Controlled delivery and release of surfactant for enhanced oil recovery by nanodroplets"; Fuel; vol. 218; Year: 2018; pp. 396-405.
Kang, Dong Jin et al.; "Synthesizing Pickering nanoemulsions by vapor condensation"; ACS Applied Materials & Interfaces; May 30, 2018; pp. 1-29.
Saelices, Clara Jimenez et al.; "Design of Pickering Micro- and Nanoemulsions Based on the Structural Characteristics of Nanocelluloses"; Bio Macromolecules; vol. 19; Year: 2018; pp. 460-469.

* cited by examiner

*Primary Examiner* — Deve V Hall
(74) *Attorney, Agent, or Firm* — NKL Law; Allen Xue

(57) ABSTRACT

Polymer-coated nanoparticles, a composite nano-emulsion and a macro-emulsion are provided. In the polymer-coated nanoparticles, the polymer self-assembles into a cage-shaped structure to coat the nanoparticles; and the nanoparticles are iron-containing metal oxides. The polymer-coated nanoparticle shell provided by the present invention can be used as a stabilizer to prepare a composite nano-emulsion, and furthermore, a stable macro-emulsion can be prepared at an extremely low concentration. The problems that high-concentration surfactants and solid particles are required to stay on an oil-water interface in macro-emulsion synthesis, and surface tension is reduced to stabilize large oil drops are overcome.

15 Claims, 27 Drawing Sheets d

POLYMER-COATED NANOPARTICLES, COMPOSITE NANO- EMULSION AND MACRO-EMULSION

TECHNICAL FIELD

The present invention belongs to the field of nano-composite materials, and in particular relates to polymer-coated nanoparticles, a composite nano-emulsion and a macro-emulsion.

BACKGROUND

An emulsion is a heterogeneous system composed of two or more immiscible phases, with at least one being dispersed in the other continuous phase liquids in the form of liquid droplets. Two liquids, such as oil and water, can either form an oil-in-water (O/W) emulsion, with oil being a dispersed phase, or form a water-in-oil emulsion (W/O), with water being the dispersed phase. By mixing these two liquids, a variety of emulsions can also be formed, including "oil in water in oil (O/W/O)" and "water in oil in water (W/O/W)" emulsions.

Emulsions can be divided into macro-emulsions, nano-emulsions, and micro-emulsions according to particle size and properties. Traditional macro-emulsions are easily formed by adding low concentrations of surfactants or surface-active polymers to reduce the surface tension between the dispersed phase and continuous phase. Surfactants are amphiphilic and are widely used as emulsifiers, which have a strong adsorption effect on the oil-water interface. The hydrophobic groups point to the oil phase, and the hydrophilic groups point to the aqueous phase, which reduces the interfacial energy and hinders the expansion and coalescence of droplets. These surfactants may be nonionic, anionic, cationic or zwitterionic. Likewise, surface-active polymers with amphiphilic properties have also been proven to be effective stabilizers because the chains are amphiphilic and can effectively reduce the oil-water interfacial tension and prevent emulsion instability. For example, in patent US2008/0250701A1, it is described that succinic acid diester polymers can be used to prepare a water-in-oil macro-emulsion. The polymer contains a large hydrocarbon group connected by two ester bonds to two hydrophilic alkyl oxygen chains, and the molecular weight ranges from 500 to 1200.

An alternative method to surfactants and surface-active polymers to form macro-emulsions is to use solid particles to form emulsions, which are known as Pickering emulsions. Compared with traditional emulsions, Pickering emulsions can maintain long-term stability because solid particles can reside at the liquid-liquid interface and form a shell around the droplets, providing a strong mechanical barrier for droplet coalescence. In addition, due to the reduced use of surfactants, Pickering emulsions have lower cytotoxicity and better biocompatibility than conventional emulsions. Therefore, Pickering emulsions are being widely concerned by industries such as petroleum, biomedicine, and food. According to the Pickering emulsion theory, there are two key factors to form a stable emulsion: first, the surface coverage needs to be high enough to stabilize the emulsion over time, which requires that the particles should be close to complete surface coverage on the droplet surface and have a sufficiently dense particle layer. At this stage, the interaction of nanoparticles at the interface is dominated by gravitational forces, resulting in the formation of a coherent monolayer with significant mechanical strength, preventing coalescence between droplets. Although Vignati et al. reported that the particle surface coverage of droplets can be as low as 5% (Vignati et al., 2003), it is generally believed that to obtain a stable emulsion, the particle surface coverage should not be less than 29%, and crosslinking between particles is required to form gel structures (Midmore, 1998). Second, the partial wettability of an emulsifier is another important factor affecting the stability and type of the emulsion. In order to achieve interfacial adsorption, the particle surface must have both hydrophilic and lipophilic groups. In order to control the wettability of the surface of solid particles, various methods have been used to adjust the surface properties of the particles. For example, the surface of rigid particles can be modified by non-covalent adsorption or covalent linkage of surfactants, polymers, and small molecules to selectively alter wettability and monodispersity. Yoon et al. previously synthesized iron oxide nanoparticles by the co-precipitation method of $Fe^{2+}$ and $Fe^{3+}$ ions, and then simply mixed the synthesized nanoparticles with a copolymer of sulfonated polystyrene and malonic acid (PSS-alt-MA) polymer. Their study and subsequent studies found that PSS-alt-MA iron oxide nanoparticles synthesized by this simple adsorption method could not stabilize non-covalently adsorbed polymers in high-salt solutions in the presence of divalent metal ions (such as calcium ions), and that noncovalently adsorbed polymers were easily shed from the particle surface. In addition, the PSS-alt-MA iron oxide nanoparticles are highly hydrophilic nanoparticles, which do not have lipophilic and hydrophilic amphiphilic properties, and cannot be directly used as emulsifiers to stabilize emulsions. The emulsions can be stabilized only by linking each copolymer-adsorbed iron oxide nanoparticle with hexamethylene diamine and 1-ethyl-3-(3-dimethylaminopropyl) carbodiimide hydrochloride cross-linking agent to enhance its hydrophobicity. And due to weak gelation, PSS-alt-MA iron oxide nanoparticles are not stable in API solution (8 wt % NaCl+2 wt % CaCl) in the presence of divalent metal ions (Yoon et al., 2011; Bargaria et al., 2013). Although Bargaria et al., 2013 found that a polysulfonated copolymer (2-acrylamide-2-methylpropanesulfonic acid and acrylic acid copolymer, 2-methyl-2-acrylamidopropane-sulfonate-co-acrylic acid) (AMPS-co-AA) weakly bind calcium ions, which can stabilize iron oxide nanoparticles in high temperature, high sodium and high calcium API saline solution (8 wt % sodium chloride+2 wt % calcium chloride), and can resist extreme dilution and prevent aggregation substances from nanoparticles (Iqbal et al., 2017). But the production of such nanoparticles requires a tedious and expensive process of covalent attachment to encase the entire nanoparticle in a polymer. For example, in order to realize the complete coating of iron oxide nanoparticles by polymers, at least three steps are required: firstly, the iron oxide nanoparticles synthesized by a co-precipitation method were placed in tetraethoxysilane, so that the surface of the nanoparticles is covered by silicon; secondly, the silicon-coated iron oxide nanoparticles were putted into 3-aminopropyltriethoxysilane for surface amination; finally, the aminated and silicon-coated iron oxide nanoparticles were completely encapsulated with 2-acrylamide-2-methyl-propanesulfonic acid and acrylic acid copolymer. Obviously, this method of fully encapsulating nanoparticles through covalent linkage requires cumbersome steps and is difficult to apply to a large-scale production process. Therefore, it is urgent to develop a method for conveniently wrapping nanoparticles, so that nanoparticles can resist the environment of high temperature, high pressure and high salt in the ground.

Compared with macro-emulsions and microemulsions, the droplet diameter of nano-emulsions is about 20-500 nanometers, which can be stably dispersed in solutions like nanoparticles, with high specific surface area per unit, optically transparent appearance and a tunable rheology, and therefore the nano-emulsions have a wide range of applications in the fields of drug delivery, food, cosmetics, drugs and material synthesis. Nano-emulsions were first widely used in nanomedicine, but recently the concept of nanomedicine has also been applied to petroleum engineering. Compared to traditional surfactant flooding, the use of surfactant-synthesized nanodroplets can significantly reduce the adsorption of surfactants to rock surfaces and increase tertiary oil recovery by about 8% (Nourafkan et al., 2018). However, nano-emulsions are a thermodynamically extremely unstable system, which is very prone to Ostawald ripening (Ostawald ripening), and the small nanodroplets in the nano-emulsion are prone to aggregation and growth. Traditional nano-emulsions can also be stabilized by surfactants and polymers. For example, the U.S. Pat. No. 835,763B92 describes a method including introducing a nano-emulsion into a wellbore containing a surfactant. However, such oil-surfactant-polymer-stabilized nano-emulsions are prone to surfactant desorption and droplet aggregation growth at high temperature and pressure. Theoretically, if nanoparticles are used to stabilize a liquid-liquid interface, the formed Pickering nano-emulsions have higher stability. However, even with very fine nanoparticles, the synthesis of stable Pickering nanodroplets smaller than 500 nm remains a great challenge. Kang et al. (2018) designed a method for the synthesis of nanoscale Pickering nano-emulsions using water vapor condensation, but this method can only synthesize water-in-oil Pickering nano-emulsions. Saelices and Capron (2018) tried to use dextran nanoparticles to synthesize oil-in-water Pickering nano-emulsions. However, they found that it is difficult to synthesize Pickering nano-emulsions under normal pressure conditions, and the Pickering nano-emulsions of oil-in-water can only be synthesized under high pressure conditions.

Based on difficult synthesis, complicated steps and high cost of the above-mentioned Pickering emulsions, the current synthesis of macro-emulsions often requires high concentrations of surfactants and solid particles to stay on an oil-water interface, and surface tension is reduced to stabilize large oil droplets. It is of great interest to develop a simple, cost-effective method for synthesizing emulsions.

SUMMARY

Based on the defects of the above-mentioned synthesis of Pickering emulsions in the prior art, a technical problem to be solved by the present invention is to provide a method for synthesizing emulsions, which method uses polymer-coated nanoparticles or surfactants in combination with metal ions as emulsifiers to stabilize nanodroplets, and then uses nanodroplets as emulsifiers to stabilize the emulsion and expand the surface area of the emulsion, thereby reducing the amount of nanoparticles and surfactants used to stabilize the emulsion, and reducing the production cost of traditional emulsions.

The present invention provides a method for preparing stable nano-emulsion and micro-emulsion with polymer-coated nano particles. The nanodroplets provided by the present invention are much more efficient in stabilizing emulsions than using nanoparticles and surfactants alone. The present invention also develops a method for polymer-encapsulated nanoparticles: nanoparticles, especially iron oxide nanoparticles (5-150 nm), can be synthesized by biomimetic mineralization methods. First, the polymer is assembled to form a cage-shaped structure, and by taking the cage formed by the self-assembly of the polymer as the cage-shaped structure, nanoparticles are formed inside the cage-shaped structure, so that the nanoparticles are completely wrapped by the polymer and are not affected by high salt water, brine, elevated temperature or other harsh conditions, and without the need for expensive and cumbersome chemical covalent linkages to wrap polymer molecules onto the nanoparticle surface. The composition of the polymer can be adjusted according to the conditions of the target application, such as reservoir temperature, pressure and salinity. These coated nanoparticles and surfactants, especially in combination with multivalent metal cations, can form stabilized oil-phase nano-droplets (100 to 600 nm in diameter) in the aqueous phase. Nanodroplets in turn stabilize emulsion systems with larger particle sizes (large oil droplets dispersed in the aqueous phase).

The polymer-coated nanoparticles provided by the present invention and surfactants provide a new and convenient method for preparing stable nanodroplets. Both nanodroplets and nanodroplet-stabilized macro-emulsions have broad applications ranging from drug delivery to enhanced in situ or in vivo imaging to enhanced oil recovery rates and catalysis.

Specifically, in order to solve the above-mentioned technical problems, the present invention provides the following technical solutions:

The first object of the present invention is to provide a polymer-coated nanoparticle, where the polymer self-assembles into a cage-shaped structure and coats the nanoparticle; and the nanoparticles are iron-containing metal oxides.

The polymer contains sulfonic acid groups and carboxyl groups, the sulfonic acid groups and the carboxyl groups can be completely or partially converted into salt forms, and the salts are potassium salts, sodium salts, and ammonium salts.

Further, the polymer is obtained by copolymerization of unsaturated monomers containing the sulfonic acid groups and unsaturated monomers containing the carboxyl groups; the unsaturated monomers containing the sulfonic acid groups include styrene sulfonate, methacryl sulfonate, propenyl sulfonate, vinyl sulfonate, butenyl sulfonate, 2-acrylamide-2-methyl propane sulfonate; and the unsaturated monomers containing the carboxyl groups are selected from maleic acid, acrylic acid, methacrylic acid, crotonic acid, 2-ethylacrylic acid, 2-pentenoic acid, 4-pentene, 2-octenoic acid, 3-vinylbenzoic acid, 4-vinylbenzoic acid, 10-undecenoic acid, erucic acid, brassenoic acid, palmitoleic acid, oleic acid, nervonic acid, linolenic acid, ricinoleic acid, 4-oxo-4-phenyl-2-butenoic acid, 2-bromoacrylic acid, 2-bromomethyl-acrylic acid, sorbic acid, itaconic acid, citraconic acid, fumaric acid, methylfumaric acid, mesaconic acid, 2-methylsuccinic acid, mucofuric acid.

The molecular weight of the polymer is determined by the size and space of the cage-shaped structure. Generally, the molecular weight of the polymer is 1 million to 3 million, preferably 1.5 million to 2 million; or the number of repeating units of the polymer is 50-200, preferably 90-120.

Preferably, the polymer is a sodium salt of poly(4-styrenesulfonic acid-maleic acid copolymer), with the quantity ratio of the sulfonate and the carboxyl in the polymer being 1:2, and the molecular weight being 1.5-2 million.

The chemical structure of the metal oxide nanoparticles is $Fe_{(3-x)}M_xO_4$ ($0 \le x \le 3$) or $Fe_{(2-x)}M_xO_3$ ($0 \le x \le 2$), wherein M is selected from Mn, Cu, Zn, Ni, Gd or Co; and the size of the metal oxide nanoparticles is 5-150 nm, preferably 10-20 nm.

Preferably, the metal oxide nanoparticles are $Fe_3O_4$, $Fe_{1.5}Co_{1.5}O_4$.

According to the polymer-coated iron-containing metal oxide nanoparticles provided by the present invention, the polymer can self-assemble to form a cage-shaped structure similar to a sphere, with an inner diameter of about 10-40 nm. The metal oxide nanoparticles are approximately spherical or ellipsoidal, and the ratio of the long axis to the short axis is 1-2. The polymer-coated iron-containing metal oxide nanoparticles can be stabilized in an aqueous solution with a pH of 3-11. The polymer-coated iron-containing metal oxide nanoparticles can withstand a high temperature of at least 90° C.; and the weight ratio of the polymer to iron oxide nanoparticles is 1-4.

A second object of the present invention is to provide a preparation method for the above-mentioned polymer-coated nanoparticles, including the following steps: a) allowing the polymer self-assemble to form a cage-shaped structure; and b) adding metal salts and oxidants to grow nanoparticle crystals within the cavity of the cage-shaped structure formed by the polymer.

The condition for the self-assembly of the polymer into a cage-shaped structure is a salt concentration of 0.05-1M halide salt, such as NaCl, KCl, preferably 0.1-0.2M, and a pH value of 3-10, preferably 5-8.5, more preferably 7-8.5; the temperature is 45-90° C., preferably 50-60° C., more preferably 50-55° C.; and the concentration of the polymer is 0.25-5 mg/mL, preferably 1-2 mg/mL. By controlling the ionic strength, pH and temperature in the solution, the polymer can form cage-shaped structures of different sizes.

The synthetic nanoparticles are synthesized in the cage formed by the polymer, specifically, the metal salt and the oxidizing agent are slowly added into the system respectively. The amount of metal salt added determines the particle size distribution of nanoparticles. Theoretically, the metal salt is added in an amount such that each polymer cage contains one nanoparticle, and a single nanoparticle in the cage has 1,000-120,000 metal atoms, preferably 5,000-10,000 metal atoms in each polymer cage.

The metal salts include iron salts, and optionally, a metal M salt may also be added, and the metal M is selected from at least one of Mn, Cu, Zn, Ni, Gd, and Co. The anions of the salts are not particularly limited, such as halide salts, sulfates, and nitrates. The iron salts are specifically selected from at least one of ferrous ammonium sulfate, ferrous chloride, ferrous sulfate, and ferrous nitrate, and the salt of the metal M is preferably a halide salt, such as manganese chloride, copper chloride, cobalt chloride.

The oxidizing agent is not particularly limited, as long as it can oxidize low-valent metal salts to high-valent salts, such as hydrogen peroxide.

The metal oxide nanoparticles and the oxidizing agent are fed according to the molar ratio of the metal salt and the oxidizing agent according to 2-3:1.

The metal salt is added at a rate of 10-200 metal ions per polymer per minute in the system, preferably 80-120 metal ions per polymer per minute.

Preferably, after the polymer-coated nanoparticles are obtained, a purification step (c) is also performed: after centrifugation, the synthesized magnetic nanoparticles were concentrated using protein enrichment tubes. Nanoparticles that did not form inside the polymer cages were removed by centrifugation, followed by concentration to obtain high concentrations of polymer-coated nanoparticles.

Further preferably, in order to ensure that each iron oxide nanoparticle is completely wrapped by the polymer cage, centrifugation was performed at a centrifugal force of 5000-20000 g for 10-30 minutes to remove magnetic nanoparticles that are easy to aggregate or difficult to wrap, and the synthesized magnetic nanoparticles were then concentrated to 20-50 mg/mL using a protein enrichment and concentration tube with a molecular weight cut-off of 100-200 KD and stored same for future use. After the polymer forms a cage-shaped structure, the nanoparticles reside in a single, self-assembled polymer cage cavity that protects the nanoparticles from being damaged by high salinity, high temperature, or other harsh conditions.

The third object of the present invention is to provide a composite nano-emulsion, including; a) a continuous phase; b) a discontinuous phase; c) a stabilizer; and d) metal ions, where the stabilizer includes the above-mentioned polymer-coated nanoparticles.

The particle size of the composite nano-emulsion is 20-1000 nm, preferably 100-600 nm.

The continuous phase is a polar solvent such as water, alcohol and nitriles, and the alcohol and nitriles polar solvents are resins in the art, such as methanol, ethanol, isopropanol, butanol, propylene glycol, glycerin, butylene glycol, acetonitrile, propionitrile etc. The polar solvent can be added alone or in the form of a solvent in the stabilizer solution.

The discontinuous phase is oil, such as unsaturated fatty acid, mineral oil, fatty oil, silicone oil, etc., which is incompatible with the continuous phase, with the ratio of discontinuous phase volume to continuous phase volume being from 0.15 to less than 1, preferably 0.18-0.3.

Polymer-coated nanoparticles can be used alone as stabilizers. Preferably, the polymer-coated nanoparticles can be combined with metal ions, which makes it easier to reach the oil-water interface.

The concentration of the polymer-coated nanoparticles in the nano-emulsion is 0.2-2 wt %, preferably 0.8-1.2 wt %.

Metal ions can be monovalent or polyvalent ions, such as at least one of $Na^+$, $K^+$, $Ca^{2+}$, $Co^{2+}$, $Ni^{2+}$, $Ba^{2+}$, $Mg^{2+}$, and $Cu^{2+}$. The concentration of metal ions in the system is 0.1-0.3M, preferably a divalent metal ion, such as at least one of $Ca^{2+}$, $Co^{2+}$, Ni2+, $Ba^{2+}$, and $Mg^{2+}$.

The polymer-coated nanoparticles can react with oil to form very small oil-phase nanodroplets with a particle size of less than 1000 nm. In this composite nano-emulsion system, polymer-coated nanoparticles, metal ions and nanodroplets all play a role in stabilizing the emulsion.

The fourth object of the present invention is to provide a preparation method for the composite nano-emulsion, including the follow steps:

A) a aqueous phase, a stabilizer, metal ion and an oil phase were added for mixing, where the stabilizer includes the above-mentioned polymer-coated nanoparticles; and B) centrifugal separation was performed, and the emulsion in the middle layer was taken as a composite nano-emulsion.

Nano-emulsions can aggregate at the oil-water interface, and the oil and water content can be quantitatively evaluated by optical or magnetic methods, where the optical method may be a fluorescence or laser method, and the magnetic method may be a magnetic resonance, magnetoacoustic, electromagnetic, magnetic susceptibility or magnetization method.

Further preferably, the stabilizer can also be added with an anionic surfactant and a cationic surfactant, and adsorbed on the nanodroplets so that the nanodroplets can reduce the surface tension of the liquid-liquid interface and oil is more effectively extracted from the reservoir. Metal ions at the interface of polymer-coated nanoparticles and nanodroplets can dynamically react with oil to form nano- or micro-scale emulsions. More efficient recovery of oil from reservoirs is achieved compared to conventional Pickering emulsions.

The fifth object of the present invention is to provide a macro-emulsion, including: a) a continuous phase; b) a discontinuous phase; and c) a stabilizer which includes the above-mentioned composite nano-emulsion. The meaning of the term "macro-emulsion" corresponds to "micro-emulsion" or "nano-emulsion", indicating that the size of the particles in the emulsion is 10-100 μm, and its oil-water interface covers many composite nano-emulsions and microemulsions (1-10 μm), with a very high specific surface area.

The continuous phase is a polar solvent such as water, alcohol and nitriles, and the alcohol and nitriles polar solvents are resins known in the art, such as methanol, ethanol, isopropanol, butanol, propylene glycol, glycerol, butanediol, acetonitrile, propionitrile, etc. The polar solvent can be added alone or in the form of a solvent in the stabilizer solution.

The discontinuous phase is an oil, such as unsaturated fatty acid, mineral oil, fatty oil, silicone oil, etc., which is incompatible with the continuous phase, with the ratio of discontinuous phase volume to the continuous phase volume being 0.5-3, preferably 1-2.

The role of the polymer-coated nanoparticles provided by the present invention as a stabilizer that can stabilize the emulsion is multifaceted. First, the specific wettability of the polymer-coated nanoparticles themselves makes the nanoparticles adsorbed on the oil/water interface to form a monolayer and/or multilayer film, thereby stabilizing the emulsion. Second, the metal ions can be combined with the functional groups of the polymer and attached to the nanodroplet interface together with the polymer-coated nanoparticles to play a stabilizing role. Third, the polymer-coated nanoparticles combined with metal ions stabilize the oil-water interface and can form very small oil-phase nanodroplets with oil-water, and the nanodroplets can stabilize the oil-water interface with a larger size and further form microdroplets, i.e. macro-emulsions. This one-to-one stabilization mode, that is, the stabilizer provided by the present invention, is a macro-emulsion stabilized by the synergistic effect of the polymer-coated nanoparticles, metal ions and the formed nano/microdroplets, and the concentration of the polymer-coated nanoparticles required is very low. It has been proved through experiments that at a very low concentration of 0.0002 wt %, the polymer-coated nanoparticles provided by the present invention can form a stable macro-emulsion. The concentration is extremely low to have the advantage of low cost. At the same time, the method for stabilizing the emulsion is simple, easy to operate, and has industrial advantages.

The sixth object of the present invention is to provide a preparation method for above-mentioned macro-emulsion, including the following steps:

The prepared composite nano-emulsion was uniformly mixed with a continuous phase and a discontinuous phase to obtain a macro-emulsion.

The seventh object of the present invention is to provide use of the composite nano-emulsion for drug delivery, in situ or in vivo imaging, displacement of residual petroleum or catalysis.

For example, when used to displace residual oil, compared with other oil displacing agents, the Pickering composite nano-emulsion of the present invention can be specifically adsorbed on the oil-water interface of residual oil and react to generate oil-phase nanodroplets with larger particle size and microdroplet displacement, and about 30% of the residual oil at normal temperature and pressure can be displaced out.

Compared with other currently synthesized polymer iron oxide nanoparticles and Pickering emulsions, the technical solution of the present invention has the following advantages:

1. The present invention provides polymer-coated nanoparticles that can control the particle size distribution by adding different amounts of metal ions, such as the amount of iron, without the need for expensive and cumbersome chemical covalently linking of polymer molecules to the surface of nanoparticles, which can resistant to harsh conditions such as high salt and high temperature, and the composition of the surface polymer can be adjusted according to the conditions of the intended application.
2. The polymer-coated nanoparticles of the present invention have the advantages of monodispersity, size distribution, shape stability and controllability as the nanoparticles are assembled into cages and are strictly controlled by the cages, and the individual nanoparticles are well coated with the polymer. This eliminates the need for traditional methods to use several steps to covalently link nanoparticles with expensive cross-linkers and polymers to obtain monodisperse nanoparticles that are stable under high-salt conditions. Moreover, the synthesis process of the polymer-coated nanoparticles provided by the present invention is simple. With the polymer self-assembled cage as a nano-platform, it is only necessary to gradually add a certain amount of reaction solution according to the concentration of the polymer in the solution. Since this synthesis method is similar to biomineralization, it can be performed at relatively low temperature and pH, which avoids the limitations in conventional chemical synthesis methods that require the use of high temperatures and organic solvents to form well-shaped and highly crystalline nanoparticles.
3. The present inventors have made use of the property that polymer-coated nanoparticles or surfactants, which are completely hydrophilic, can bind metal ions but are stable at a high concentration of metal ions, a method of forming oil-in-water nano-emulsions under normal pressure, which can stabilize oil-phase nanodroplets (20 to 600 nm in diameter) in aqueous phase, and a method of stabilizing macro-emulsion by continuing dynamic reaction and crosslinking with oil by surface-coating polymer-coated nanoparticles, surfactants and multivalent metal ions. This method of stabilizing macro-emulsions through nano-droplets has not been reported so far, and not only greatly increases the specific surface area of the emulsion, but also greatly reduces the amount of solid particles or surfactants, and overcomes the limitation of conventional macro-emulsion which needs a large amount of solid particles or surfactant to stabilize, thereby having wide application values.
4. Moreover, the Pickering emulsion provided by the present invention can form into complex nano-emulsion and/or microdroplets by adding electrolyte and metal ions, which first form very small nanodroplets, and these nanodroplets can be used for stabilizing larger nanodroplets. This greatly expands the specific surface area of the nano-emulsion. The necessity for conventional nanoparticles to adsorb or covalently attach surfactants, polymers or small molecules to selectively alter the wettability of the nanoparticles is overcome. Pickering nano-emulsions are successfully synthesized by adsorbing polymer-coated nanoparticles and metal ions on the liquid-liquid interface. The polymer-coated nanoparticles can be cross-linked to each other at the interface, forming a strong steric mechanical barrier that prevents the aggregation and growth of oil-phase nanodroplets.

5. Nanodroplets stabilized by polymer-coated nanoparticles can replace traditional nanoparticles, and nanodroplets and micro-droplets with larger specific surface areas are formed at the interface of large droplets to provide space barriers. As the size and specific surface area of the nanoparticles are greatly increased by the nanodroplets and microdroplets, the number of nanoparticles required at macro-emulsion interfaces is greatly reduced to 0.002-0.1 wt %. This is the minimum amount currently reported for nanoparticles.
6. The polymer-coated nanoparticle-stabilized emulsion provided by the present invention is superior in stability to conventional Pickering emulsions and has a larger surface area. The large surface area means that this macro-emulsion has a wide range of applications in enhanced recovery and catalytic performance.
7. The preparation method of the composite nano-emulsion provided by the present invention is simple. By adjusting the metal ion composition and concentration, the surfactant and the components of the oil phase, it is possible to synthesize a complex nano-emulsion composed of a plurality of extremely fine droplets of different oil phase components mixed. The complex nano-emulsion has high specific surface area, the surface contains polymer-wrapped nanoparticles, various metal ions or surfactants, and has a wide application prospect in enhanced oil recovery or catalysis. Meanwhile, it is found that when the composite nano-emulsion is used to stabilize a macro-emulsion, a lower concentration is required than that of the nano-emulsion.
8. The present inventors also applied nano-emulsions and composite nano-emulsions to the detection and displacement of residual oil, and found that nano-emulsions and complex nano-emulsions can be specifically aggregated at the oil-water interface of residual oil for quantitative detecting and evaluating the content of residual oil. At the same time, it is found that nano-emulsions or complex nano-emulsions can dynamically react with oil and emulsify same, which has important application prospects in the future of enhanced oil recovery.

BRIEF DESCRIPTION OF THE DRAWINGS

FIGS. 1*a*-1*c* show the distributions of the polymer hydration particle size as measured by dynamic light scattering; and FIGS. 1*d*-1*j* show the formation of a cage-shaped structure at different temperatures under negative staining transmission electron microscopy.

DETAILED DESCRIPTION

The polymer-coated nanoparticles of the present invention, as well as the composite nano-emulsion and macro-emulsion formed therefrom will be further explained with specific examples below.

Unless otherwise specified, the reagents used in the examples of the present invention can be purchased commercially.

Example 1. A Polymer Self-Assembled to Form a Cage-Shaped Structure

Figure 1:
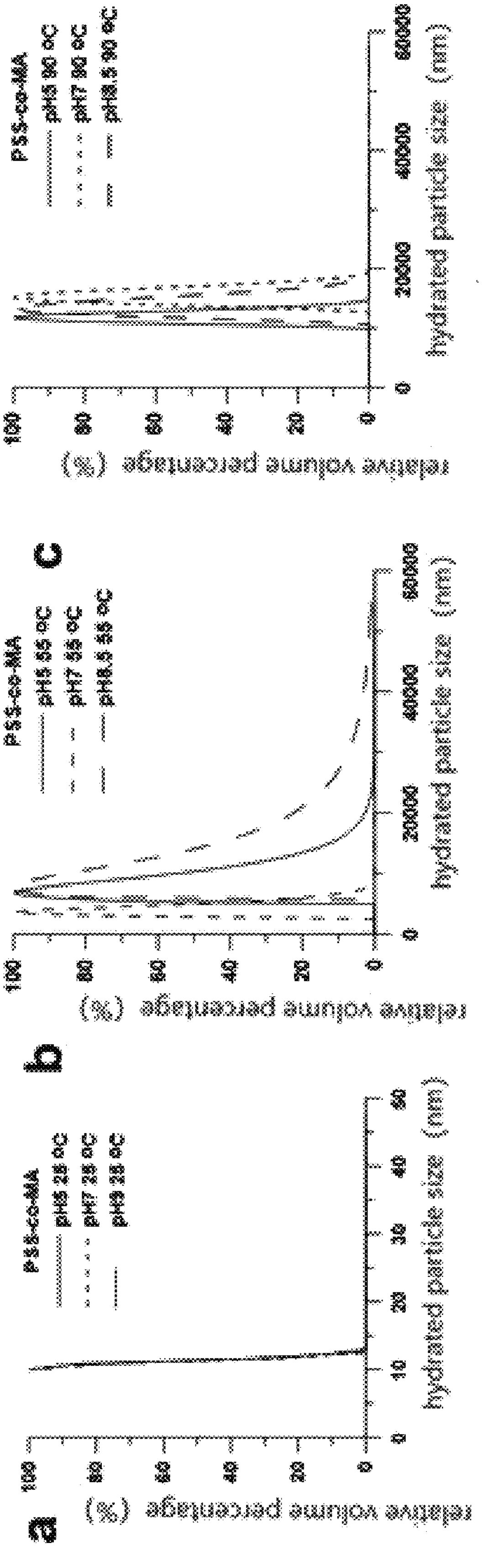
FIG. 1 shows the self-assembly of poly(4-styrenesulfonic acid-maleic acid copolymer) sodium salt (PSS-co-MA) in Example 1 to form a cage-shaped structure under different pH and temperature conditions.
Figure 1:
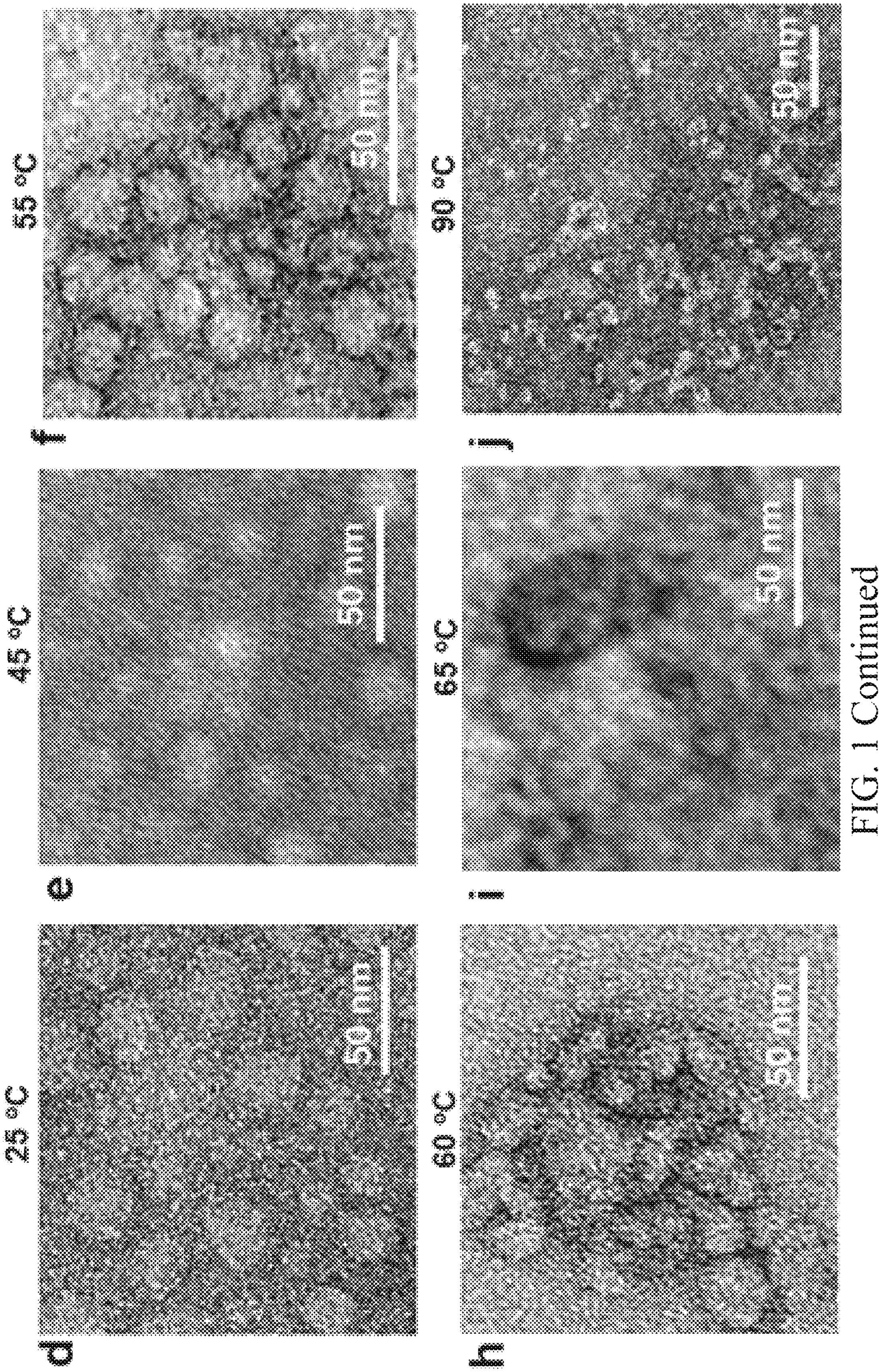

Sodium salt of 4-styrenesulfonic acid-maleic acid copolymer (the molecular weight is about 20000, and the molar ratio of styrenesulfonic acid and the maleic acid is 1:1) was prepared with 0.1M NaCl to a concentration of 1 mg/mL, the pH of the solution was adjusted to pH3, pH5, pH7, pH8.5, and pH9 with 0.01 M NaOH and hydrochloric acid, and the hydrated particle size of the polymer was measured under the conditions of different pH and different temperatures (25° C., 55° C., 90° C.) using dynamic light scattering. It was found that only at pH5-8.5, the polymer could well maintain the secondary structure, and the volume percent hydrated particle size was about 12 nm at 25° C. (FIG. 1*a*). When heated to 55° C. and 90° C. under the conditions of a dynamic light scattering instrument, the polymer began to self-assemble to form a structure with a larger hydrated particle size. Since the dynamic light scattering measurement of the hydrated particle size is easily affected by temperature and aggregation, in order to observe the structure formed by the self-assembly of the polymer more intuitively, we heated the polymer to different temperatures under the condition of pH7-8.5, and then took the polymer solution to observe the morphology of the polymer through negative transmission electron microscopy, and finally found that the polymer can self-assemble to form monodisperse cage-shaped structure at 55° C. The polymer cage-shaped structure formed by self-assembly was measured for sulfur isotope content in the polymer by single particle inductively coupled plasma mass spectrometry (ICP7900), and it was finally determined that the cage-shaped structure of the polymer was assembled from 96 monomers, and the molecular weight was about 1920000. FIGS. 1*a*-1*j* show the self-assembly of poly(4-styrenesulfonic acid-maleic acid copolymer) sodium salt (PSS-co-MA) in Example 1 to form a cage-shaped structure under different pH and temperature conditions. (a) The hydration of the polymer measured by dynamic light scattering has a particle size distribution at normal temperature (25° C.), it is found that the secondary structure of the polymer can only be formed at pH 5-8.5, while the polymer forms a tertiary structure with a larger hydration particle size when the temperature is increased to 55° C. (b) and 90° C. (c), respectively. Since the hydrated particle size is easily affected by temperature and aggregation, (d j) we observed negative staining transmission electron microscopy on 1 mg/mL polymer in 0.1 m NaCl, pH8.5 at different temperatures to form cage-like structures. It was found through experiment that the polymer PSS-co-MA can self-assemble to form a cage-shaped structure at pH 8.5 and 55° C. The inner diameter of the cage-shaped cavity is about 13-40 nm, and the average inner diameter is 18.8±2.5 nm.

Example 2. Preparation of Polymer-Coated Iron Oxide Nanoparticles by Biomimetic Synthesis All solutions were deoxygenated and placed in anaerobic chambers. Solutions of ammonium ferrous sulfate (100 mM) and hydrogen peroxide (33.33 mM) were prepared separately in anaerobic deionized water. In order to obtain self-assembled polymers, 1 g of polystyrene sulfonate sodium-maleic acid copolymer (PSS-co-MA, molecular weight about 20,000) polymer was dissolved in 1 L of 0.1 M NaCl solution until the final concentration is 1 mg/mL, the pH value is adjusted to 8.5 with 0.5M NaOH, and the temperature is controlled at 55° C. for 10 min through an electric heating mantle, so that the polymer begins to self-assemble and form a cage-shaped structure (each cage contains 96 monomers with a molecular weight of about 1,920,000) under the conditions of salt ion concentration, pH and temperature. Based on the number of moles of polymer cages and the molar concentration of ferrous ammonium sulfate, it was calculated to add ferrous ammonium sulfate (100 mM) and hydrogen peroxide (33.34 mM)

solutions at a rate of 80 iron atoms per minute per cage, theoretically about 5000, 20000, 60000 and 80000 iron atoms were added to each cage to form iron oxide (magnetite, $Fe_3O_4$) nanoparticles with different particle size distribution, respectively PSS-co-MA5000, PSS-co-$MA_{20000}$, PSS-co-$MA_{60000}$, PSS-co-$MA_{80000}$, respectively. In order to ensure that each iron oxide nanoparticle is completely encapsulated by the polymer cage, the magnetic nanoparticles that are easy to assemble or difficult to encapsulate are removed under a centrifugal force of 10,000 g, and the synthesized magnetic nanoparticles were concentrated using a molecular weight 100 kD protein enrichment tube (amicon Ultra-12100 kda) to remove free polymer to 30 mg/mL for storage. The iron content and the polymer content in the nanoparticles were determined by inductively coupled plasma mass spectrometry (ICP-MS) and thermogravimetric analysis (TGA).

Figure 2:
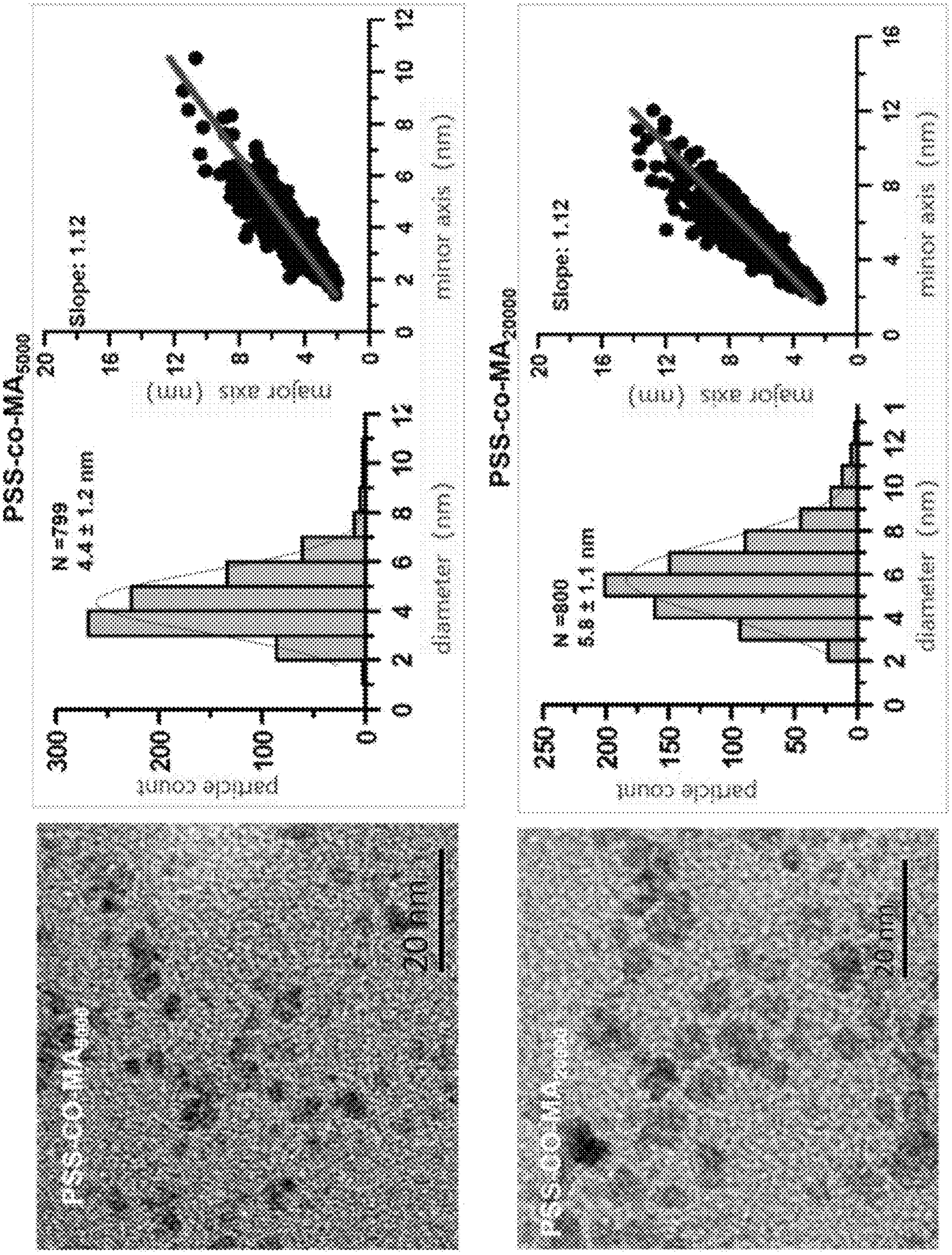
FIG. 2 shows the electron micrographs, the particle size distribution and the ratio of major and minor axes of the polymer-coated nanoparticles formed by biomimetic synthesis of varying numbers of iron atoms (5000, 20000, 60000, 80000) into PSS-co-MA cages in Example 2.
Figure 2:
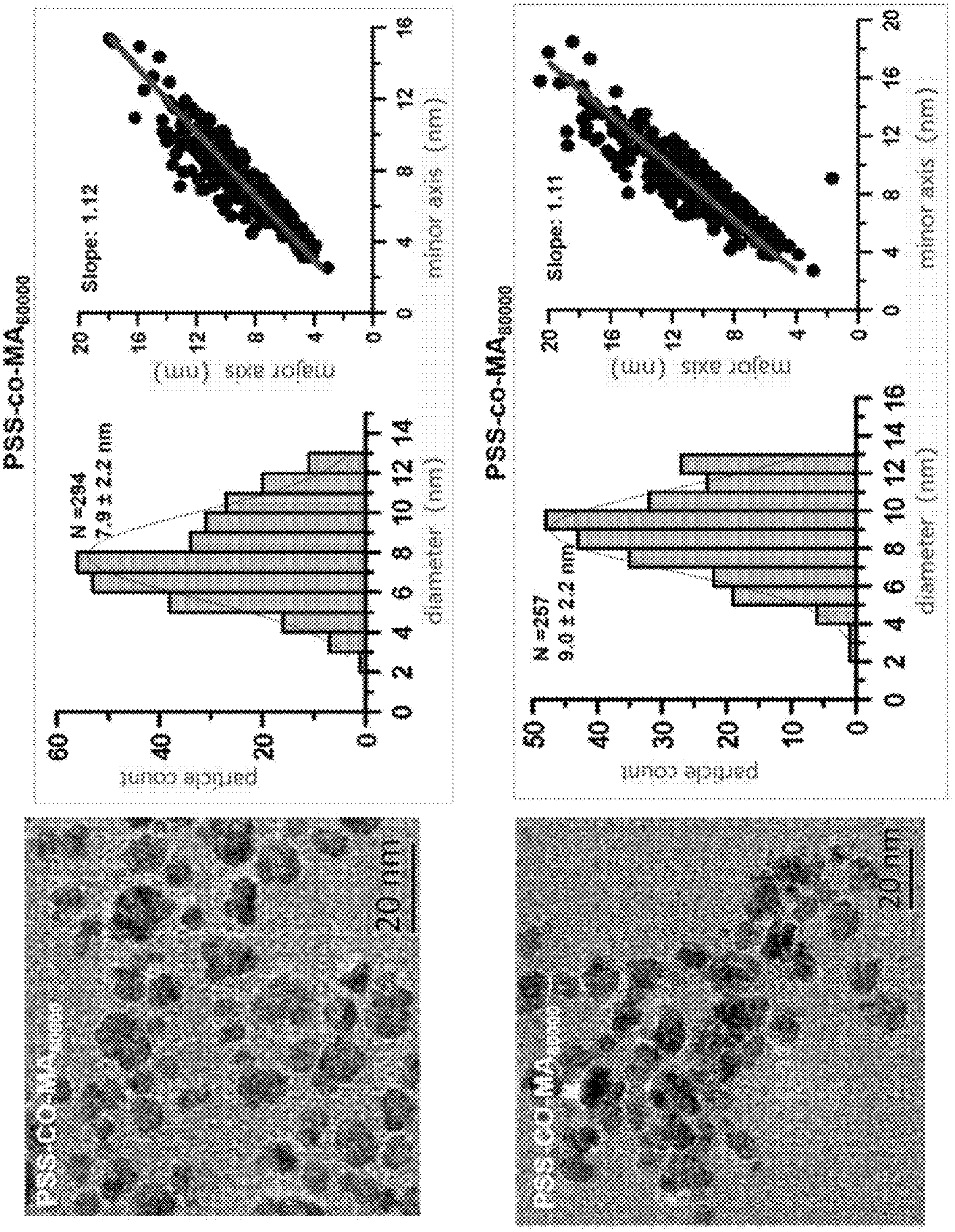
Figure 3:
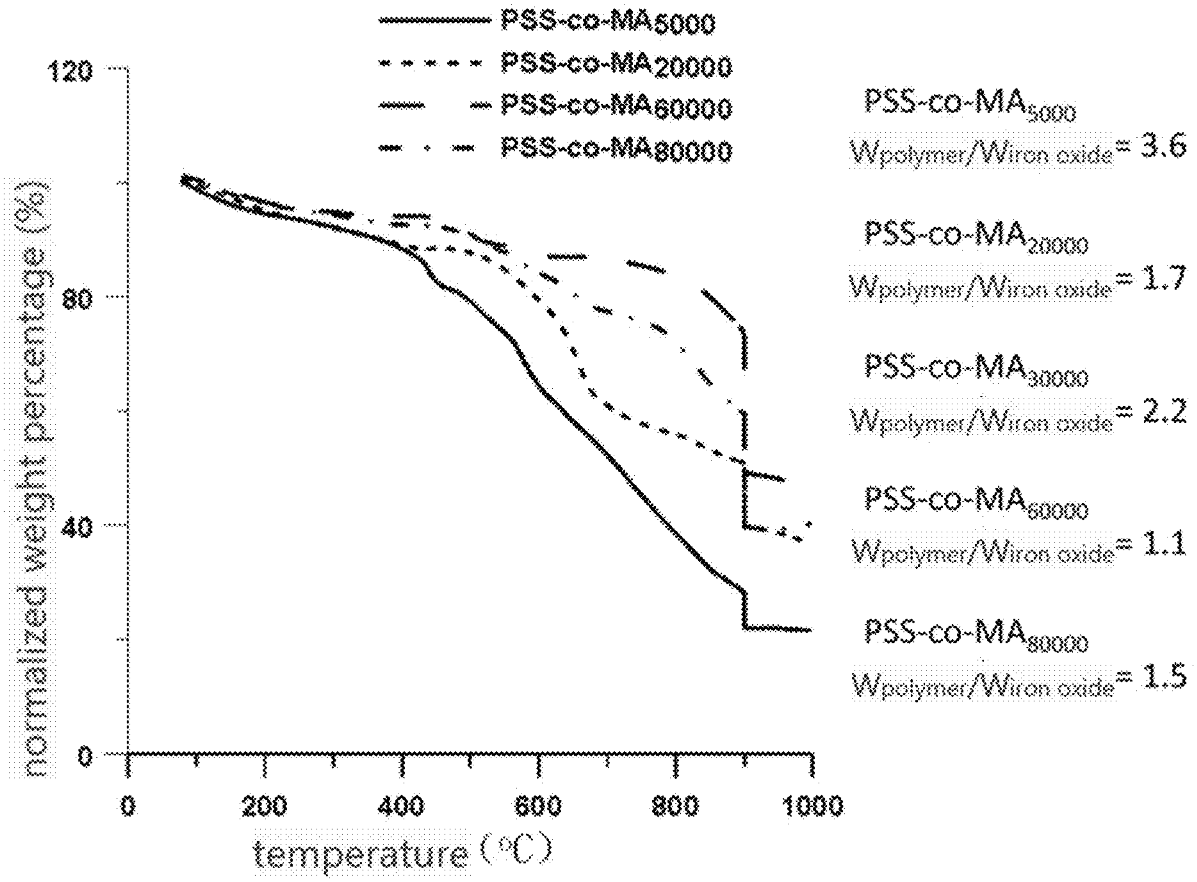
FIG. 3 shows the thermogravimetric analysis of the biomimetic polymer PSS-co-MA coated iron oxide nanoparticles with different loading of iron atoms (PSS-co-MA5000, PSS-co-$MA_{20000}$, PSS-co-$MA_{30000}$, PSS-co-$MA_{60000}$, PSS-co-$MA_{80000}$).
Figure 4:
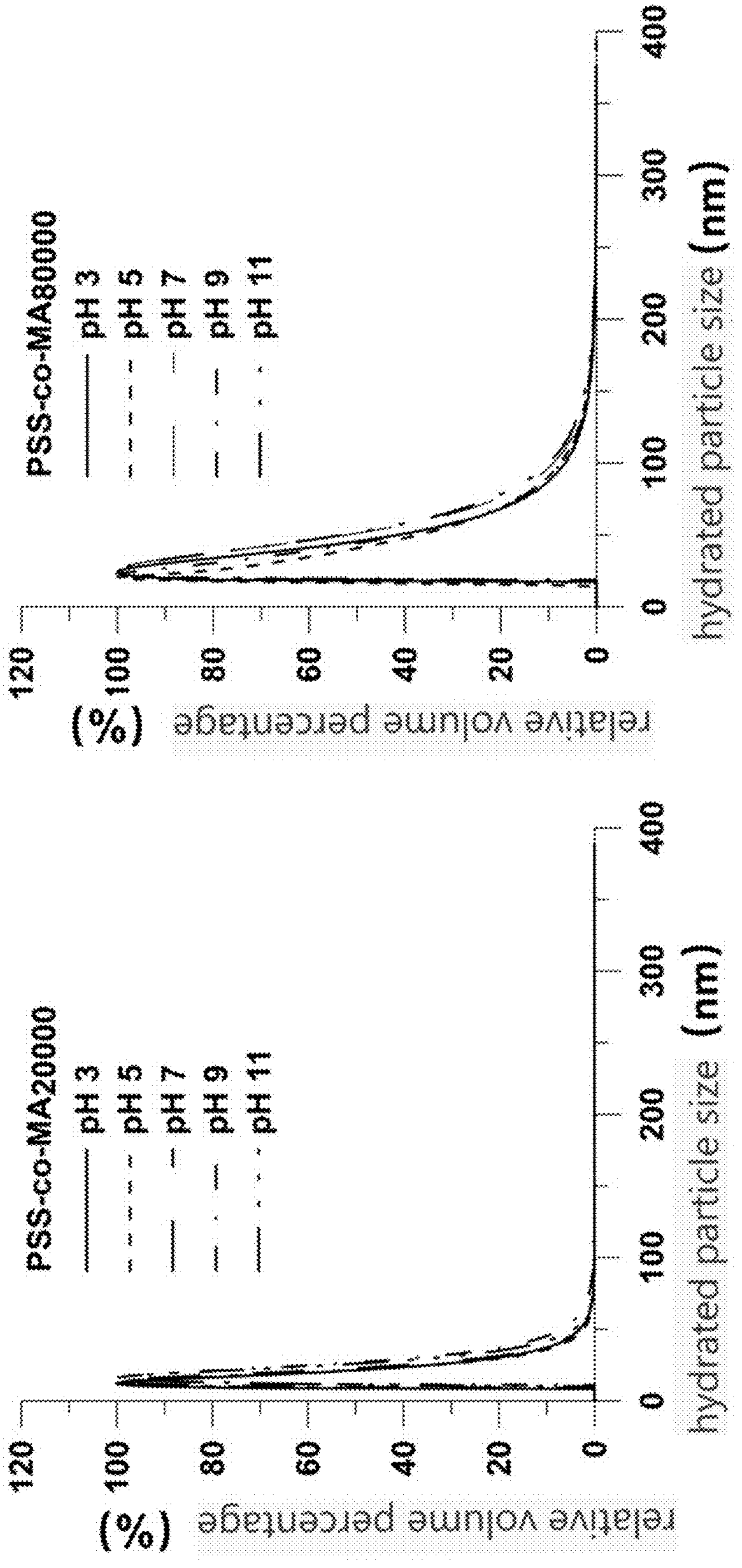
FIG. 4 shows the stability of different iron atoms loaded polymer PSS-co-MA coated iron oxide nanoparticles (PSS-co-$MA_{20000}$, PSS-co-$MA_{80000}$) synthesized by Example 2 between pH3-11.
Figure 5:
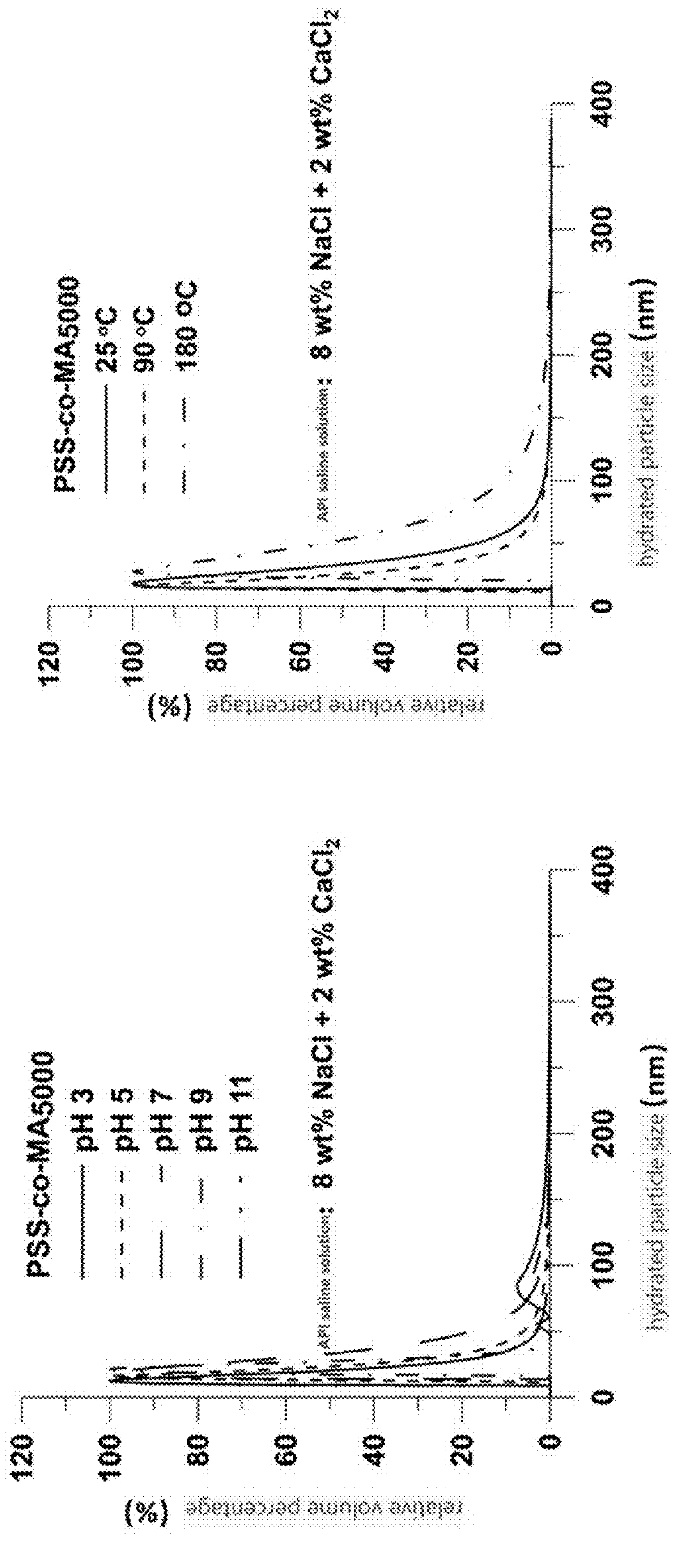
FIG. 5 shows the stability of the polymer PSS-co-MA coated iron oxide nanoparticles synthesized by Example 2 under high concentration saline (API solution: 8 Wt % NaCl+2 wt % $CaCl_2$)) and high temperature conditions (90° C., 180° C.).
Figure 6:
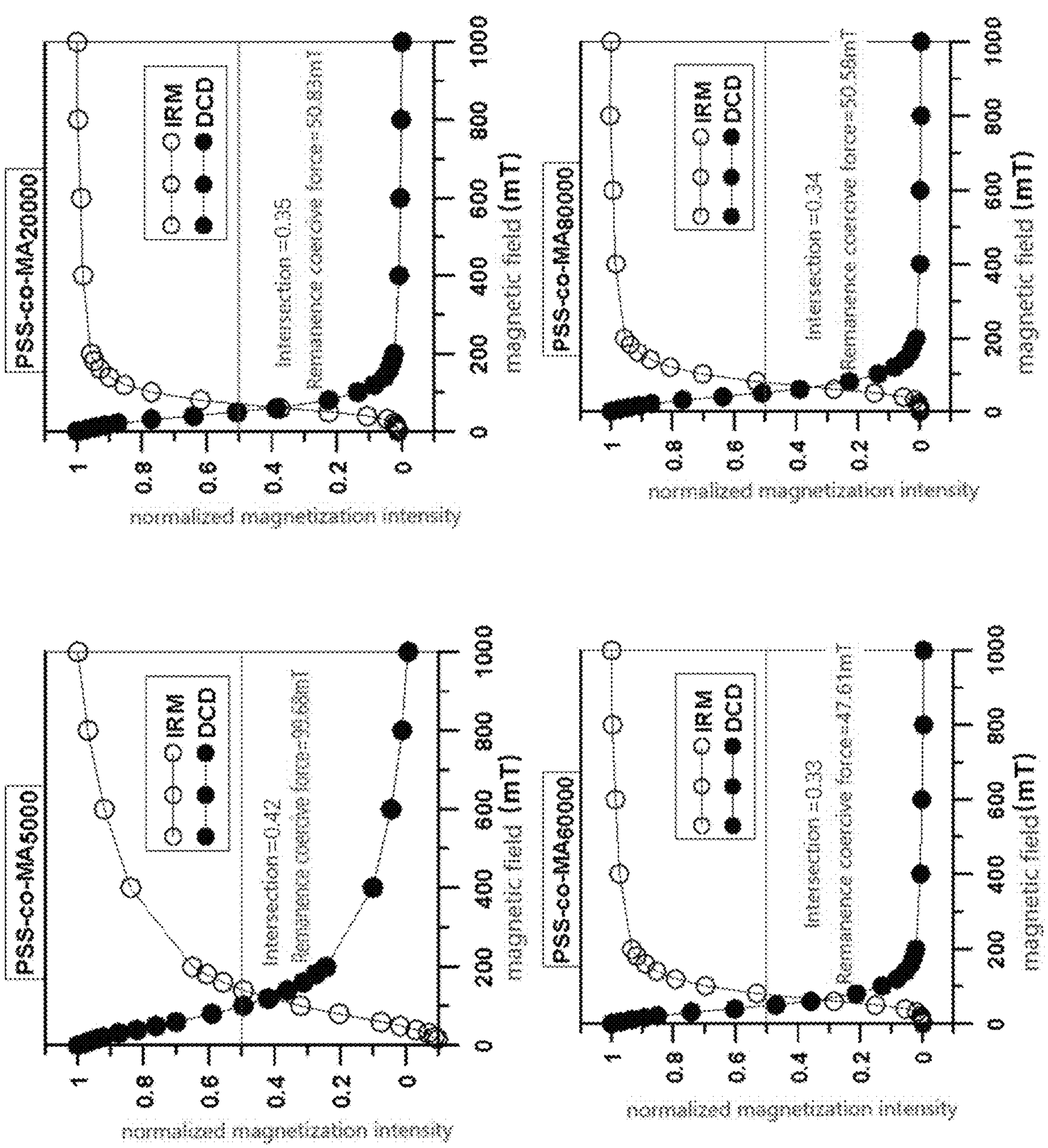
FIG. 6 shows the isothermal IRM acquisition curves and demagnetization curves (DCD) at 5 k for different Fe atom loaded biomimetic PSS-co-MA coated iron oxide nanoparticles synthesized in Example 2 (PSS-co-$MA_{5000}$, PSS-co-$MA_{20000}$, PSS-co-$MA_{60000}$, PSS-co-$MA_{80000}$).
Figure 7:
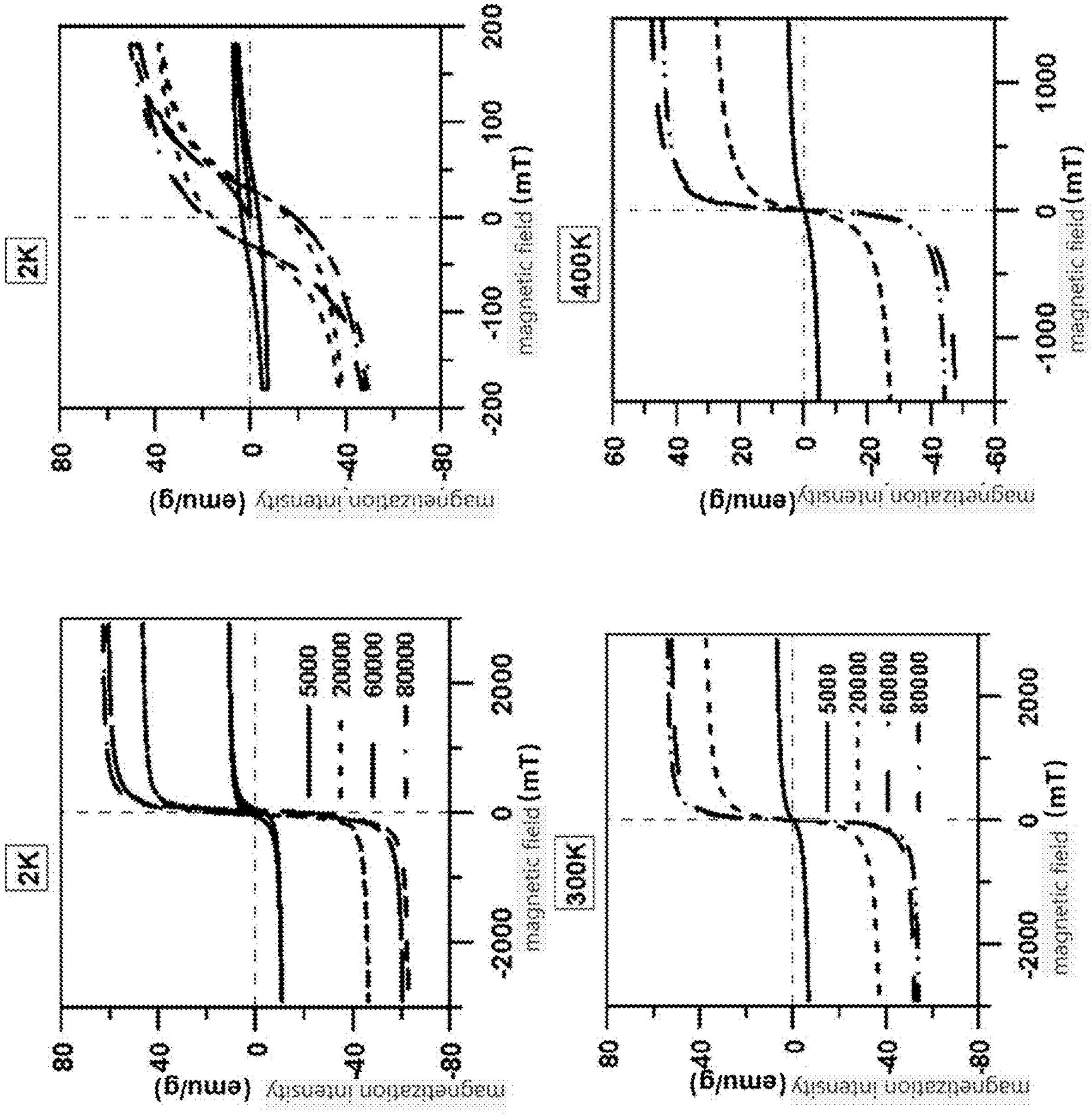
FIG. 7 shows the hysteresis loops of biomimetic polymer PSS-co-MA coated iron oxide nanoparticles loaded with different iron atoms (PSS-co-$MA_{5000}$, PSS-co-$MA_{20000}$, PSS-co-$MA_{60000}$, PSS-co-$MA_{80000}$) at different temperatures.
Figure 9:
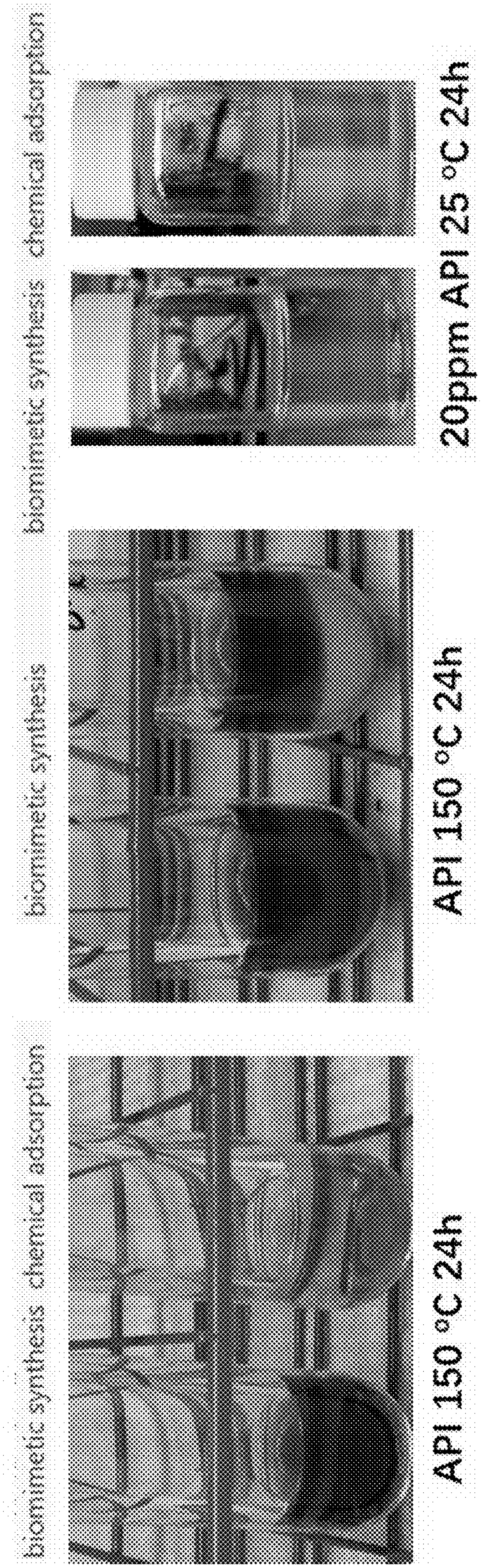
FIG. 9 shows the difference between the biomimetic polymer PSS-co-MA coated iron oxide nanoparticles (PSS-co-$MA_{5000}$) synthesized by Example 2 and the conventional ultrasound chemisorbed polymer PSS-co-MA coated iron oxide nanoparticles by Comparative Example.
Figure 10:
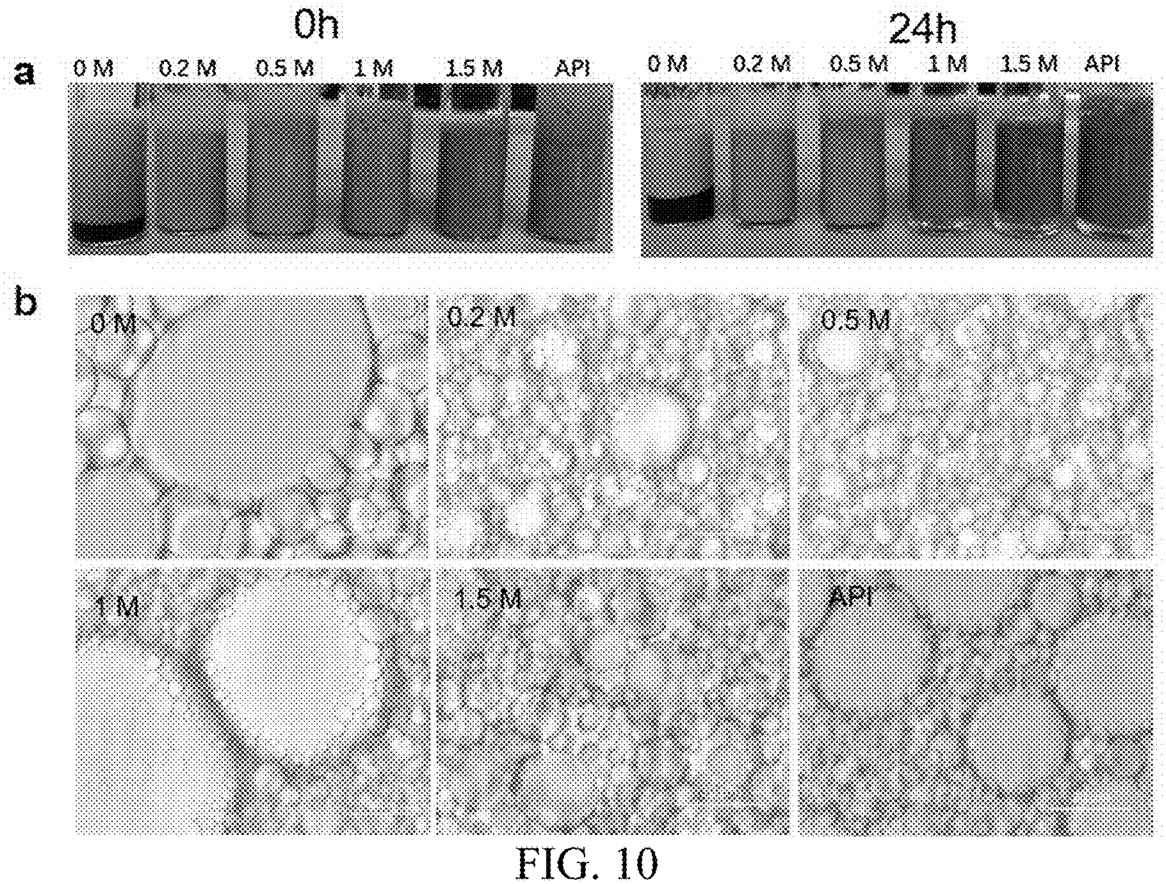
FIG. 10 shows the optical (FIG. 10*a*) and microscopic (FIG. 10*b*) photographs of the emulsion of polymer-coated iron oxide nanoparticles (PSS-co-MA5000, 0.1 wt %) synthesized in Example 2 mixed with dodecane at different concentrations of NaCl.
Figure 11:
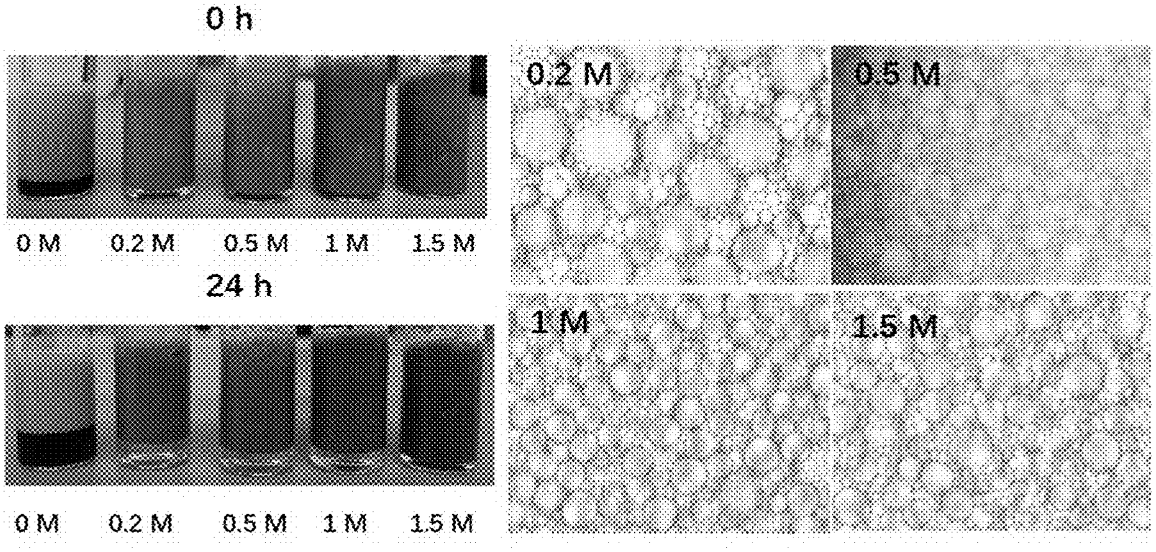
FIG. 11 shows the optical (FIG. 11*a*) and microscopic (FIG. 11*b*) photographs of the emulsion of polymer-coated iron oxide nanoparticles (PSS-co-MA5000, 0.1 wt %) synthesized in Example 2 mixed with dodecane at different concentrations of $CaCl_2$

FIG. 2 shows that polymer PSS-co-MA coated iron oxide ($Fe_3O_4$) nanoparticles with average core sizes of 4.4±1.2 nm, 5.8±1.1 nm, 7.9±2.2 nm, 9.0±2.2 nm can be synthesized in Example 2 by loading different numbers of iron atoms (5000, 20000, 60000, 80000) into PSS-co-MA cages through biomimetic synthesis. Due to the cage-shaped structure formed by the self-assembly of polymer PSS-co-MA, the morphology of these nano-ions is well controlled, approximately spherical, with a shape factor (the ratio of major axis to minor axis) of about 1.2. In addition, since the average inner diameter of the cage formed by the self-assembly of polymer PSS-co-MA is 18.8±2.5 nm, it is theoretically possible to synthesize iron oxide nanoparticles with a core size of about 20 nm as the number of iron atoms increases. FIG. 3 shows the thermogravimetric analysis of biomimetic polymer PSS-co-MA coated iron oxide nanoparticles with different loading of iron atoms (PSS-co-$MA_{5000}$, PSS-co-$MA_{20000}$, PSS-co-$MA_{30000}$, PSS-co-$MA_{60000}$, PSS-co-$MA_{80000}$) synthesized by Example 2. The polymer coats the iron oxide nanoparticles, and the weight ratio of the polymer to the iron oxide nanoparticles is among 1.1-3.6. FIG. 4 shows the stability of the polymer PSS-co-MA coated iron oxide nanoparticles (PSS-co-MA20000, PSS-co-MA80000) synthesized by Example 2 with different iron atoms loaded between pH3-11. The results of the hydrated particle size measured by dynamic light scattering showed that polymer-coated nanoparticles with 20,000 iron atoms in the core (PSS-co-$MA_{20000}$) and polymer-coated nanoparticles with 80,000 iron atoms in the core (PSS-co-$MA_{20000}$) co-$MA_{80000}$) did not change significantly between pH 3-11, indicating that aqueous solutions of these polymer-coated iron oxide nanoparticles are stable within this pH range. FIG. 5 shows the polymer PSS-co-MA coated iron oxide nanoparticles synthesized by Example 2 in high concentration saline (API solution: 8 wt % NaCl+2 wt % $CaCl_2$)) and high temperature (90° C., 180° C.) stability. The results of the hydrated particle size measured by dynamic light scattering show that the polymer-coated nanoparticles (PSS-co-MA5000) containing 5000 iron atoms in the core have no significant change in the relative volume percentage of the hydrated particle size within 48 hours, and can be stabilized at API solution under different pH conditions (pH 3-11). When placed at 90° C. and 180° C. for 48 hours, the relative volume percentage of the hydrated particle size changes only slightly, which also shows that the polymer-coated nanoparticles can be stable in the API solution at 90° C. and 180° C. FIG. 6 shows the isothermal IRM acquisition curves and DCD curves at 5 k of the Fe-loaded biomimetic PSS-co-MA coated iron oxide nanoparticles (PSS-co-MA5000, PSS-co-MA20000, PSS-co-MA60000, PSS-co-MA80000) synthesized in Example 2, and their remanence coercivity are 99.68 mT, 50.83 mT, 47.61 mT, 50.58 mT, respectively, indicating that the mineral phase of iron oxide nanoparticles is magnetite with low coercivity. Theoretically, when the intersection point of the isothermal remanence acquisition curve and the demagnetization curve is R=0.5, the intersection point between the isothermal remanence acquisition curve and the demagnetization curve between these particles is between 0.34-0.42, indicating that these particles are well wrapped by the polymer, and there is only weak magnetic interaction between particles. FIG. 7 shows the hysteresis loop of the biomimetic polymer PSS-co-MA coated iron oxide nanoparticles loaded with different iron atoms (PSS-co-$MA_{5000}$, PSS-co-$MA_{20000}$, PSS-co-$MA_{60000}$, PSS-co-$MA_{80000}$) at different temperature. The hysteresis loop results at 2K show that all nanoparticles are saturated at 300 mT, and the coercive force is <60 mT, indicating that its mineral composition is ferrimagnetic magnetite. As the number of iron atoms in the nucleus increases, the saturation magnetization of the particles increases. The coercive force of all nanoparticles is basically zero at 300 K, indicating that these particles are typical superparamagnetic nanoparticles. FIG. 9 shows the difference between the biomimetic polymer PSS-co-MA coated iron oxide nanoparticles (PSS-co-$MA_{5000}$) synthesized by Example 2 and the conventional ultrasonic chemical adsorption polymer PSS-co-MA coated iron oxide nanoparticles by Comparative Example. (a) The biomimetic PSS-co-MA iron oxide nanoparticles can resist the high temperature of 150° C. for 24 hours in the API solution, while the PSS-co-MA iron oxide nanoparticles cannot resist the high temperature of 150° C. by ultrasonic chemical adsorption; (b) the biomimetic PSS-co-MA iron oxide nanoparticles have low adsorption to quartz sand in API solution; and (c) the biomimetic PSS-co-MA iron oxide nanoparticles can resist the dilution concentration of 20 ppm (0.002 wt %) in API solution, while the PSS-co-MA iron oxide nanoparticles in API solution by ultrasonic chemisorption at 20 ppm (0.002 wt %) dilution concentration is not stable. FIG. 10 shows the optical and micrographs of the emulsion formed by mixing the polymer PSS-co-MA coated iron oxide nanoparticles (PSS-co-$MA_{5000}$, 0.1 wt %) and dodecane synthesized in Example 2 under different concentrations of NaCl.

Example 3. Preparation of Polymer-Coated Manganese-Doped and Cobalt-Doped Iron Oxide Nanoparticles by Biomimetic Synthesis All solutions were deoxygenated and placed in anaerobic chambers. A mixture of ammonium ferrous sulfate (50 mM) and cobalt chloride (50 mM) was first prepared in anaerobic deionized water, followed by a solution of the oxidant hydrogen peroxide (33.34 mM) in deionized water. To obtain self-assembled polymers, 1 g of polystyrene sulfonate sodium-maleic acid copolymer (PSS-co-MA) polymer was dissolved in 1 L of 0.1 M NaCl solution to a final concentration of 1 mg/mL, the pH value was adjusted to 8.5 with 0.5M NaOH, and the temperature was controlled at 55° C. for 10 min, so that the polymer began to self-assemble to form a cage-shaped structure under the conditions of salt ion concentration, pH value and temperature. Assuming that the cage-shaped structure of the polymer is composed of 96-mers with a molecular weight of about 1920000, a mixture of ammonium ferrous sulfate (50 mM) and cobalt chloride (50 mM) and a solution of hydrogen peroxide (33.34 mM) were then added at a rate of 40 iron and 40 cobalt atoms per minute per cage. Theoretically, 10000 iron atoms and 10000 cobalt atoms were added to each cage respectively. In order to ensure that each cobalt-manganese iron oxide nanoparticle is completely encapsulated by the polymer cage, magnetic nanoparticles that are easy to assemble or difficult to encapsulate were removed under a centrifugal force of 10,000 g, and a protein enrichment tube with a molecular weight of 100 kD (amicon Ultra-12100 kda) to concentrate the synthesized magnetic nanoparticles and remove the free polymer to 30 mg/mL for storage. The incorporation of cobalt into iron oxide nanoparticles was analyzed by energy dispersive spectroscopy.

Figure 8:
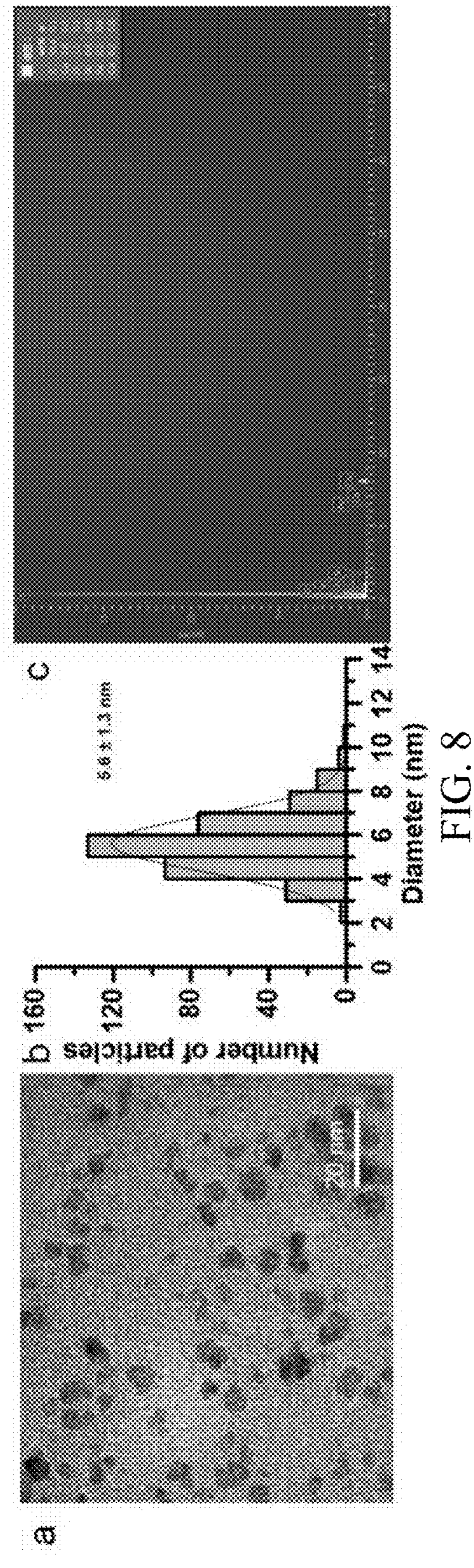
FIG. 8 shows the transmission electron micrographs (a), particle size distribution (b), and electron microscopy spectrum (c) of the polymer PSS-co-MA coated cobalt-doped iron oxide nanoparticles synthesized in Example 3.

FIG. 8 shows a transmission electron micrograph (a) of the polymer PSS-co-MA coated cobalt-doped iron oxide nanoparticles synthesized in Example 3, and the transmission electron micrograph of the iron oxide nanoparticles shows that the cobalt-doped iron oxide nanoparticles maintain good monodispersity due to the coating of the polymer; (b) the average particle size of the cobalt-doped iron oxide nanoparticles was 5.6±1.3 nm; and (c) electron microscopy showed that the ratio of Fe to Co in the polymer PSS-co-MA coated cobalt-doped iron oxide nanoparticles was 1:1, indicating that the composition was $Fe_{1.5}Co_{1.5}O_4$.

Example 4. Synthesis of Nanoparticle-Stabilized Oil-In-Water Nano-Emulsions $CaCl_2 \cdot 2H_2O$ was first dissolved in a separate vessel at a concentration of 5 M. A 20 ml glass vial was used to add 16.2 ml of 1.23 wt % PSS-co-$MA_{5000}$ iron oxide nanoparticles prepared in Example 1, 0.8 ml of 5 M CaCl solution and 3 ml of octadecene were added. The vial was held in a 400 milliliter beaker with a foam holder, cooled in an ice bath, and sonicated for a total time of 10 minutes at a 30 second/30 second 50% amplitude setting. The solution was further centrifuged at 3000 rpm to three layers. The middle layer was taken to obtain a stable nano-emulsion, the upper and lower layers were discarded, and the free oil and free nanoparticles were removed respectively.

Figure 12:
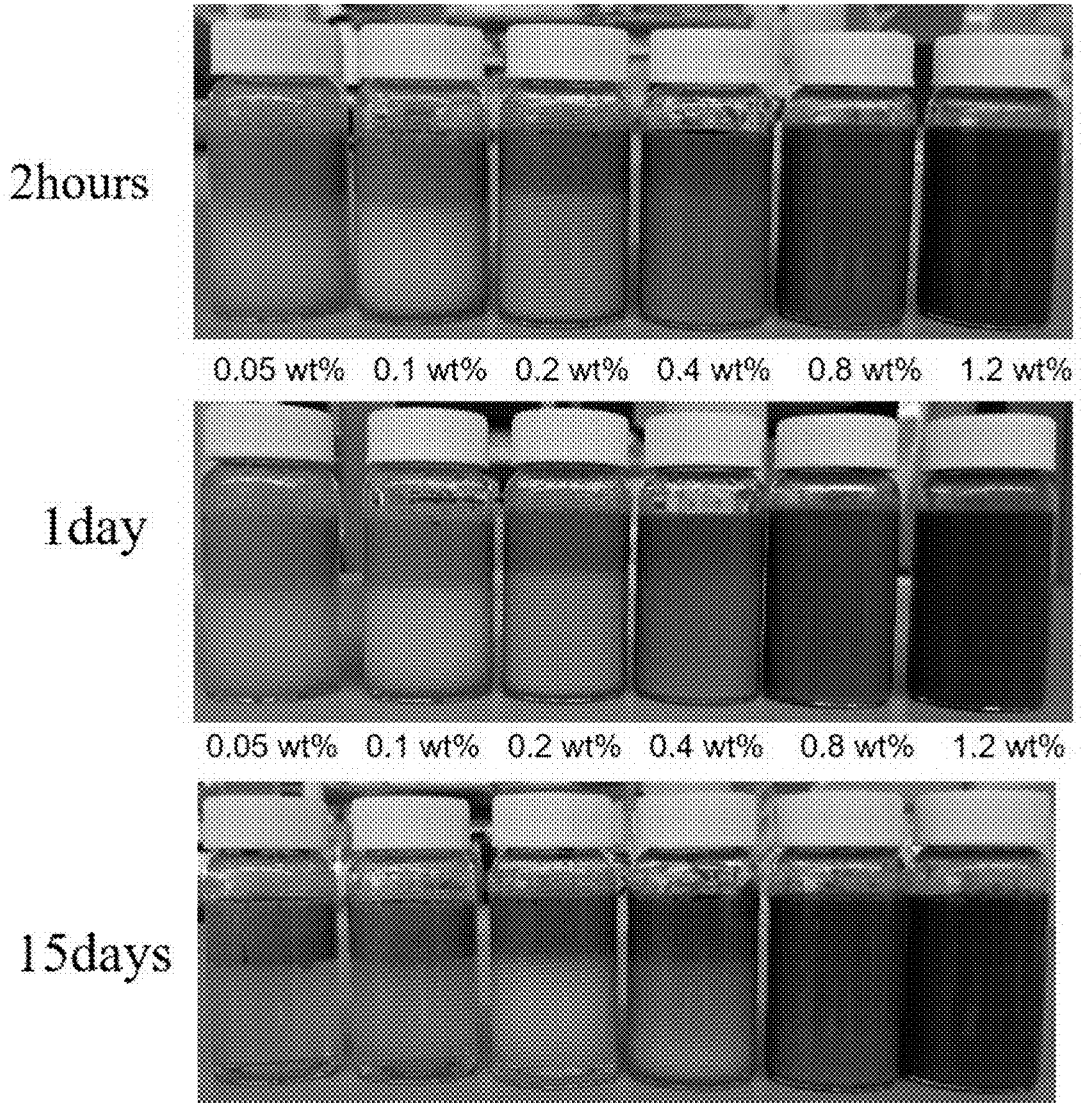
FIG. 12 shows the stability of nano-emulsions formed by Example 4 with different concentrations of polymer PSS-co-MA5000 coated iron oxide nanoparticles mixed with octadecene and 0.2M calcium chloride for different days.
Figure 13:
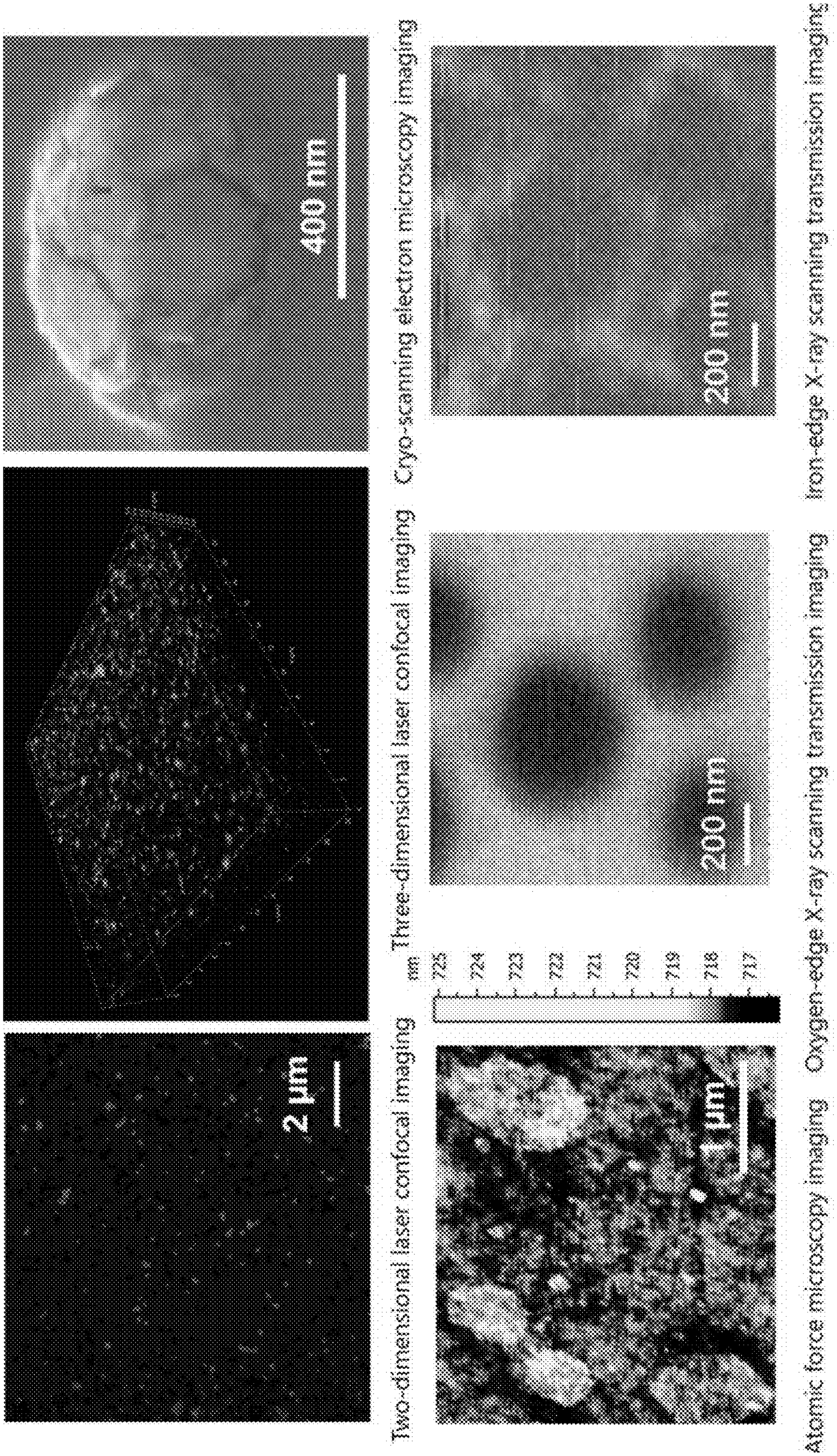
FIG. 13 shows the two-dimensional and three-dimensional laser confocal microscopy, cryo-scanning electron microscopy, atomic force microscopy), X-ray scanning transmission microscopy imaging of the nano-emulsion formed by Example 4.
Figure 14:
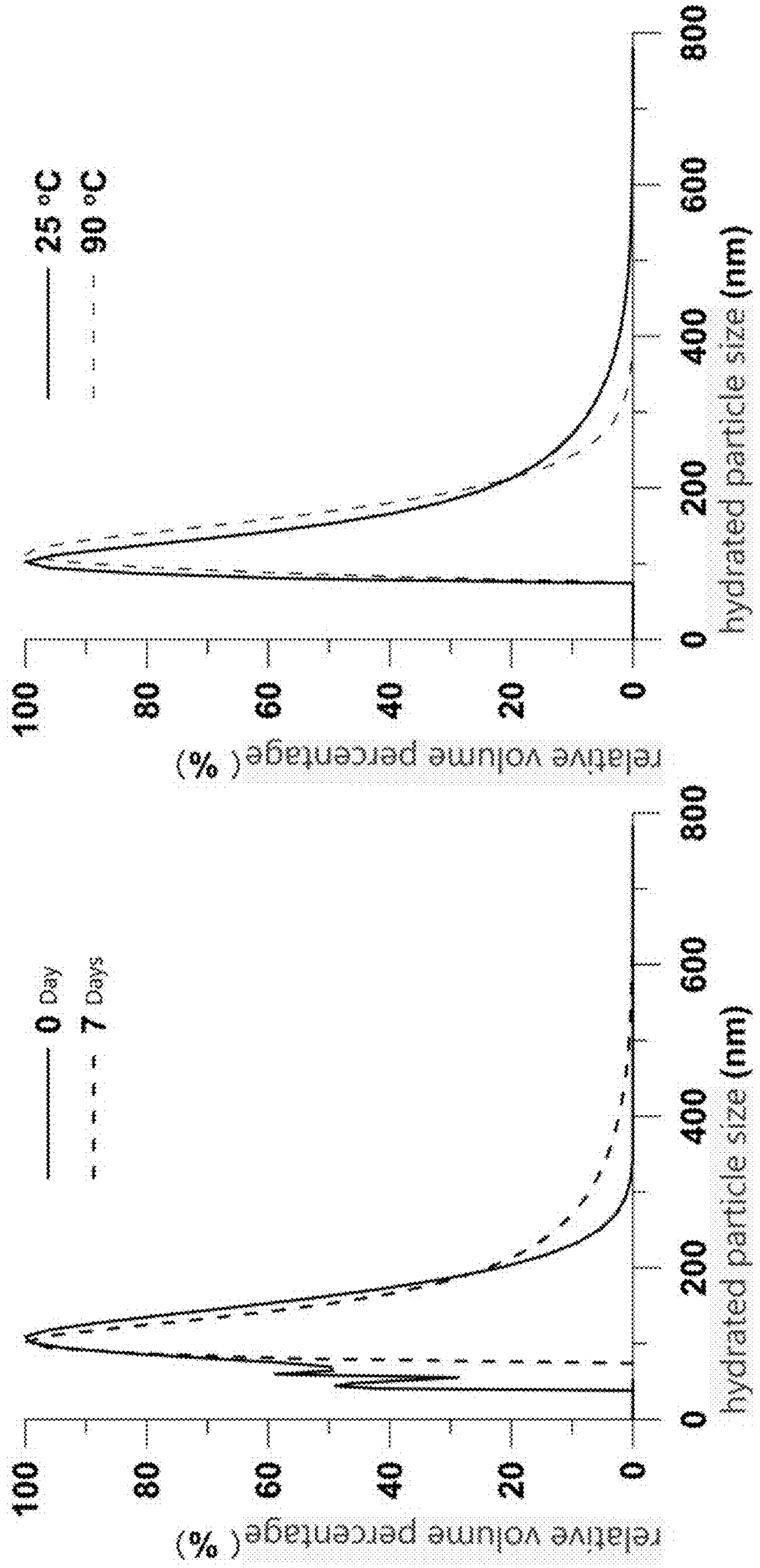
FIG. 14 shows the relationship between the hydrated particle size of the nano-emulsion formed in Example 4 and the storage time and temperature measured by dynamic light scattering.

FIG. 12 shows the nano-emulsion formed by Example 4, the polymer PSS-co-MA coated iron oxide nanoparticles mixed with octadecene and 0.2M calcium chloride. Only the concentration of polymer-coated iron oxide nanoparticles in the whole water-oil system is >0.8 wt % can a uniform nano-emulsion be completely formed without delamination. FIG. 13 shows the two-dimensional and three-dimensional laser confocal microscopy, cryo-scanning electron microscopy, atomic force microscopy), X-ray scanning transmission microscopy imaging of the nano-emulsion formed by Example 4. Two-dimensional and three-dimensional laser confocal microscopy images show that the nano-emulsion prepared by polymer-wrapped nanoparticles (PSS-co-$MA_{5000}$, 1 wt %) is a typical oil-in-water nano-emulsion, and the nano-oil droplets are monodispersed in the saline solution; atomic force microscopy shows that the surface of nano-oil droplets is covered with nanoparticles; and oxygen edge and iron edge X-ray scanning transmission imaging shows that the oil-water interface of nano-oil droplets was covered by polymer-coated iron oxide nanoparticles and stabilized in 0.2 M calcium chloride solution. FIG. 14 shows the relationship between the hydrated particle size of the nano-emulsion formed in Example 4 and the storage time and temperature measured by dynamic light scattering. The results show that the hydrated particle size of the nano-emulsion stored in 0.2M calcium chloride high-salt solution for 56 hours and the hydrated particle size measured for 7 days have only a small change and no significant difference, and the hydrated particle size distribution at 25° C. and 90° C. after storage for 7 days also had no significant difference, indicating the long-term stability of the synthesized nano-emulsion.

Example 5. Synthesis of an Oil-In-Water Composite Nano-Emulsion Containing a Single Oil Component and Multiple Metal Ions Firstly, a high-concentration mixed solution containing different metal ions was prepared, 3.68 g $CaCl_2 \cdot 2H2O$, 3.64 g $Co(NO_3)_2 \cdot 6H2O$ and 2.97 g $NiCl_2 \cdot 2H_2O$ were weighed and dissolved in 10 mL of water to prepare a final concentration of 2.5 M $CaCl_2 \cdot 2H_2O$, 1.25 M $Co(NO_3)_2 \cdot 6H_2O$ and 1.25 M $NiCl_2 \cdot 2H_2O$. In another separate glass bottle, 15.4 mL of PSS-co-$MA_{5000}$ iron oxide nanoparticles prepared in Example 1 with a concentration of 1.3 wt %, 1.6 mL of metal ion mixture, and 3 mL of octadecene were added, and the vials were fixed in a 400 ml beaker in an ice bath and sonicated with an ultrasonic wave at 30 s/30 s 50% amplitude for 10 min. To prepare composite nano-emulsions with other single oil components, other oils such as dodecane, mineral oil, and silicone oil can be used instead of octadecene. The solution was further separated into three layers by centrifugation at 3000 rpm. The middle layer was extracted to obtain a stable nano-emulsion, the upper and lower layers were discarded, and the free oil and free nanoparticles were removed, respectively.

FIGS. 21*a*-21*f* show cryo-scanning electron microscopy (a), atomic force microscopy (b), (c) oxygen-edge X-ray scanning transmission microscopy images, (d) hydrated particle size distribution and (e, f) energy spectra of composite nano-emulsions prepared by Example 5. Cryo-scanning electron microscopy, atomic force microscopy, and oxygen-edge X-ray scanning transmission electron microscopy images clearly show that the nano-droplets of a composite nano-emulsion are composed of multiple smaller nanodroplets. The hydrated particle size distribution diagram shows that the hydrated particle size of the composite nano-emulsion is 80-300 nm. Compared with the energy spectrum of the surrounding aqueous solution, the energy spectrum of the nanodroplets of the composite nano-emulsion contains more carbon, iron, calcium, cobalt, and nickel elements, indicating that a variety of metal ions combined with polymer-coated nanoparticles exist in the oil-water interface of the composite nano-emulsion.

Example 6. Synthesis of an Oil-In-Water Composite Nano-Emulsion Containing Multiple Oil Components and Multiple Metal Ions Firstly, a high-concentration mixed solution containing different metal ions was prepared, 3.68 g $CaCl_2 \cdot 2H_2O$, 3.64 g $Co(NO_3)_2 \cdot 6H_2O$ and 2.97 g $NiCl_2 \cdot 2H_2O$ were weighed and dissolved in 10 mL of water to prepare a final concentration of 2.5 M $CaCl_2 \cdot 2H_2O$, 1.25 M $Co(NO_3)_2 \cdot 6H_2O$ and 1.25 M $NiCl_2 \cdot 2H_2O$. In another separate glass bottle, 15.4 mL of PSS-co-$MA_{5000}$ iron oxide nanoparticles with a concentration of 1.3 wt % prepared in Example 1, 1.6 mL of metal ion mixture, 1 mL of octadecene, 1 mL of mineral oil and 1 mL of silicone oil were added, the vials were fixed with a foam holder in a 400 ml beaker in an ice bath and sonicated with an ultrasonic wave at 30 s/30 s 50% amplitude for 10 minutes. The solution was further separated into three layers by centrifugation at 3000 rpm. The middle layer was taken to obtain a stable nano-emulsion, the upper and lower layers were discarded, and the free oil and free nanoparticles were removed, respectively.

FIGS. 22a-22h show the cryo-scanning electron microscope images (a, c), size distribution (b), energy spectrum (d), atomic force microscopy (e) and oxygen edge, iron edge, benzene ring-edge X-ray scanning transmission X-ray microscope images (f-h) of the composite nano-emulsion prepared by Example 6. Cryo-scanning electron microscope image (a) showing nano-oil droplets monodisperse in aqueous solution; and high-resolution cryo-scanning electron microscope image (c) and AFM image (e) show that the nano-droplets of the whole nano-emulsion are composed of multiple darker and lighter-colored nano-oil droplets with smaller particle sizes, where the darker-colored small nano-droplet energy spectrum (d) shows that it contains a high concentration of silicon, indicating that it is a silicone oil, and the lighter-colored oil droplets are hydrocarbon octadecene and mineral oil. X-ray scanning transmission X-ray microscope images (f-h) of oxygen edge, iron edge and benzene ring edge showed that polymer-coated nanoparticles existed in the oil-water interface of composite nano-emulsion.

Example 7. Synthesis of an Oil-In-Water Composite Nano-Emulsion Containing Multiple Oil Components, Multiple Metal Ions and a Cationic Surfactant Firstly, the cationic surfactant dodecyltrimethylammonium bromide (DTAB) was dissolved in a separate container at a concentration of 10 mg/mL. Then another container was used to configure a high-concentration mixed solution containing different metal ions, 3.68 g $CaCl_2 \cdot 2H_2O$, 3.64 g $Co(NO_3)_2 \cdot 6H_2O$ and 2.97 g $NiCl_2 \cdot 2H_2O$ were weighed and dissolved in 10 mL of water to configure a final concentration of 2.5 M $CaCl_2 \cdot 2H_2O$, 1.25 M $Co(NO_3)_2 \cdot 6H_2O$ and 1.25 M $NiCl_2 \cdot 2H_2O$. In a separate glass bottle, 15.2 mL of PSS-co-$MA_{5000}$ iron oxide nanoparticles prepared in Example 1 with a concentration of 1.3 wt %, 0.2 mL of DTAB solution (10 mg/mL), 1.6 mL of metal ion mixture, 1 mL octadecene, 1 mL mineral oil and 1 mL silicone oil were added, the vials were fixed with a foam holder in a 400 mL beaker in an ice bath and sonicated with an ultrasonic wave at 30 s/30 s 50% amplitude for 10 min. The solution was further separated into three layers by centrifugation at 3000 rpm. The middle layer was extracted to obtain a stable nano-emulsion, discard the upper and lower layers were discarded, and the free oil and free nanoparticles were removed, respectively.

FIGS. 23a-23d show (a, b) cryo-scanning electron microscope images, (c) atomic force microscopy and (d) structural schematics of the oil-in-water composite nano-emulsion containing multi-oil components, various metal ions and cationic surfactants prepared by Example 7.

Example 8. Synthesis of an Oil-In-Water Composite Nano-Emulsion Containing Multiple Oil Components, Multiple Metal Ions and an Anionic Surfactant Firstly, the anionic surfactant sodium dodecyl sulfate (SDS) was dissolved in a separate container at a concentration of 10 mg/mL. Then another container was used to configure a high-concentration mixed solution containing different metal ions, 3.68 g $CaCl_2 \cdot 2H_2O$, 3.64 g $Co(NO_3)_2 \cdot 6H_2O$ and 2.97 g $NiCl_2 \cdot 2H_2O$ were weighed and dissolved in 10 mL of water to configure a final concentration of 2.5 M $CaCl_2 \cdot 2H_2O$, 1.25 M $Co(NO_3)_2 \cdot 6H_2O$ and 1.25 M $NiCl_2 \cdot 2H_2O$. In a separate glass bottle, 15.2 mL of PSS-co-$MA_{5000}$ iron oxide nanoparticles prepared in Example 1 with a concentration of 1.3 wt %, 0.2 mL of DTAB solution (10 mg/mL), 1.6 mL of metal ion mixture, 1 mL octadecene, 1 mL mineral oil and 1 mL silicone oil were added, the vials were fixed with a foam holder in a 400 mL beaker in an ice bath and sonicated with an ultrasonic wave at 30 s/30 s 50% amplitude for 10 min. The solution was further separated into three layers by centrifugation at 3000 rpm. The middle layer was extracted to obtain a stable nano-emulsion, the upper and lower layers were discard, and the free oil and free nanoparticles were removed, respectively.

Figure 24:
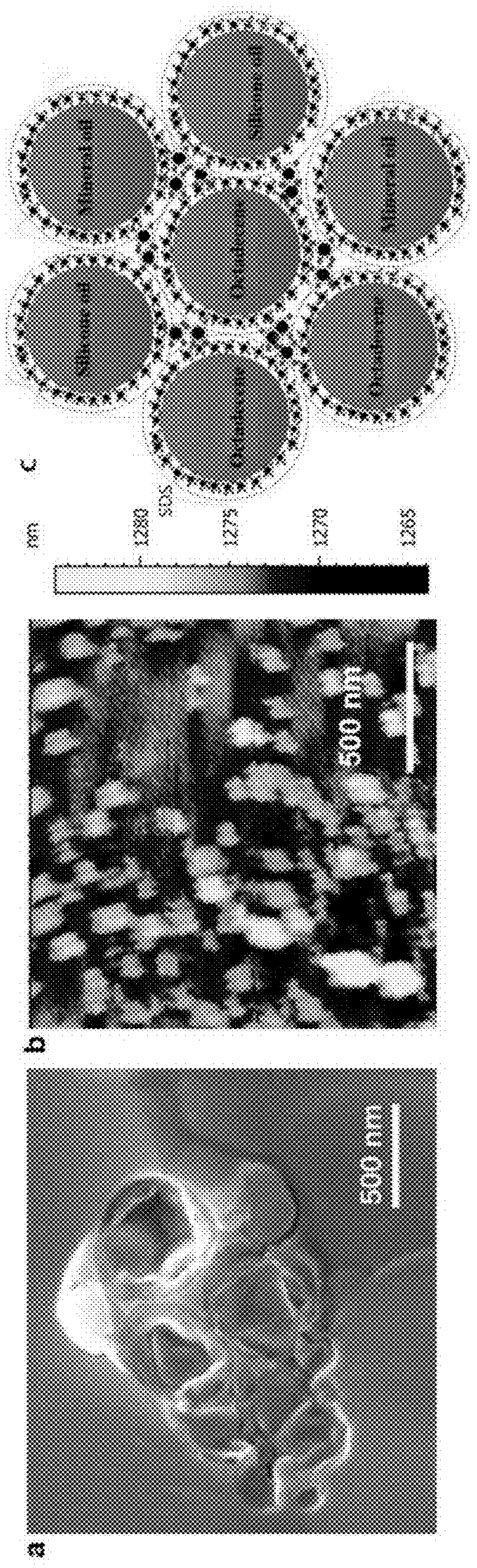
FIG. 24 shows the cryo-scanning electron microscope image (a), atomic force microscope image (b) and structural schematic diagram (c) of the composite nano-emulsion containing anionic surfactant prepared by Example 8.

FIGS. 24a-24c show the cryo-scanning electron microscope image (a), atomic force microscope image (b) and structural schematics (c) of the composite nano-emulsion containing anionic surfactant prepared by Example 8, the composite nano-emulsion in the oil-phase nanodroplets are composed of sodium dodecyl sulfate (SDS) anionic surfactant, PSS-co-MA iron oxide nanoparticles bound to calcium ions, nickel ions and cobalt ions, octadecene, mineral oil and silicone oil nano-liquids drop composition.

Example 9. Application of Nano-Emulsions to Prepare Stable Macro-Emulsions

In order to prepare nanodroplet stabilized macro-emulsions and compare same with nanoparticle stabilized emulsions, 10 mL of stabilizers and 10 mL of octadecene were respectively added to the vials, and the stabilizers were respectively a combination of the PSS-co-MA coated iron oxide nanoparticles prepared in Example 2, the polymer PSS-co-MA coated iron oxide nanoparticles prepared in Example 2 and a solution of $CaCl_2$) (the concentration of $CaCl_2$) after combination was 0.2 M), a nano-emulsion prepared in Example 4, and a combination of the nano-emulsion prepared in Example 4 and $CaCl_2$) (the concentration of $CaCl_2$) after combination was 0.2 M). The oil, water, and nano-emulsion in the vial were then homogenized using a medium intensity homogenizer for 2 minutes to obtain a macro-emulsion. The amounts of PSS-co-MA coated iron oxide nanoparticles and nano-emulsion were adjusted, so that the concentration of polymer PSS-co-MA-coated iron oxide nanoparticles in the finally macro-emulsion is 0.001-0.01 wt %. The obtained macro-emulsion was allowed to stand on a table at normal temperature and observed continuously for 58 days to see whether there was demulsification. In order to further compare the difference between polymer-coated nanoparticles and nano-emulsion stabilized macro-emulsions, the macro-emulsions prepared above were stored at room temperature, and the hydrated particle size distributions were measured using a dynamic light scattering instrument for 56 hours and 6 days, respectively, and after 7 days storage the dynamic rheological data of each emulsion was further measured using a rheometer under fixed frequency conditions. Alternatively, a stable oil-in-water nano-emulsion can be synthesized using a co-surfactant and a metal ion to prepare a macro-emulsion, similar to the procedure described above.

Figure 15:
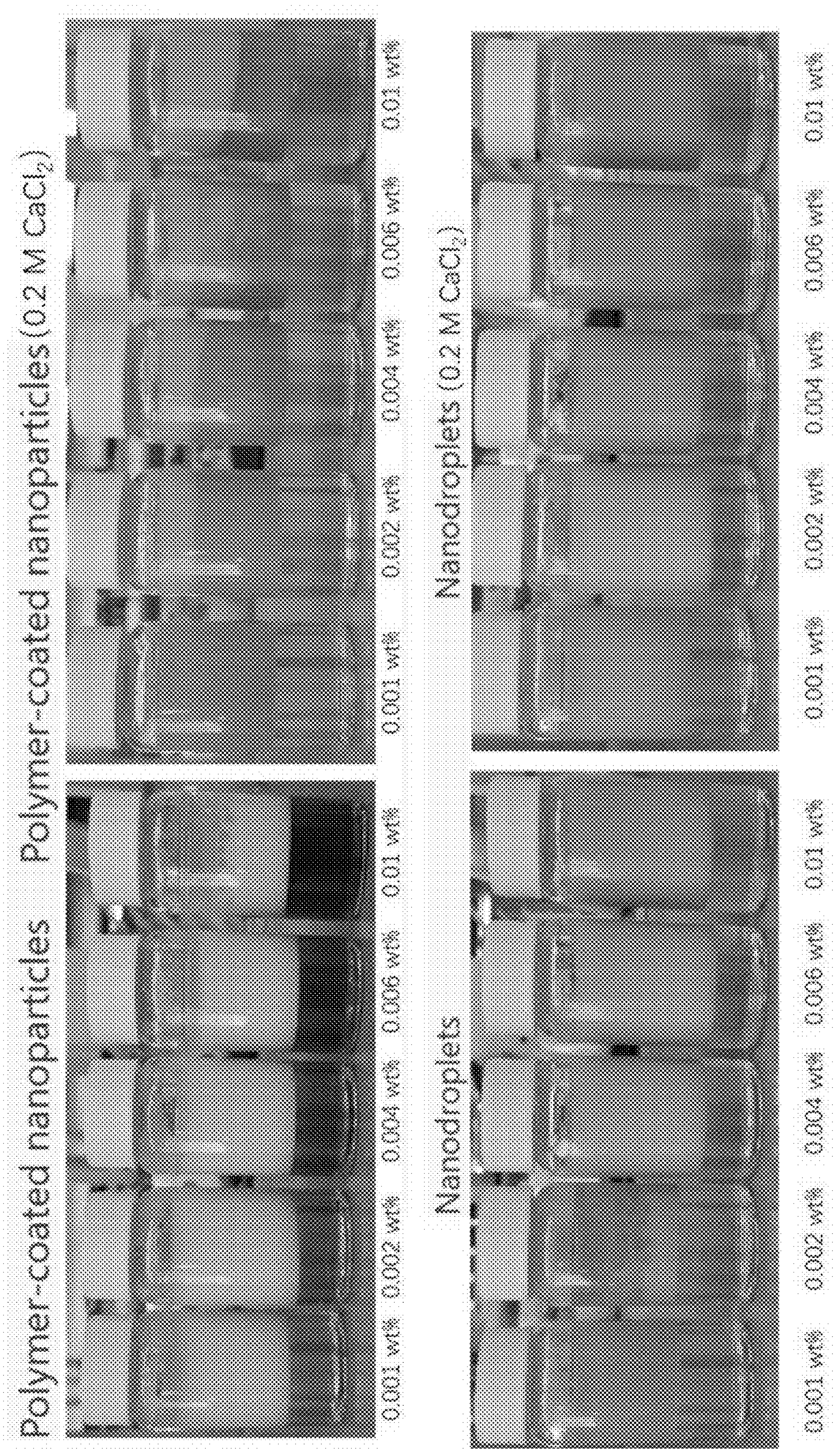
FIG. 15 compares the stability of emulsions formed by Example 9, aqueous solutions of polymer-coated iron oxide nanoparticles (PSS-co-MA5000) at different low concentrations (0.001-0.01 wt %), salt solutions of polymer-coated iron oxide nanoparticles (0.2 M $CaCl_2$)), aqueous solutions of polymer-coated iron oxide nanoparticles stabilized nanodroplets, and salt solutions of nanodroplets (0.2 M $CaCl_2$)) after storage at ambient temperature for 38 days.

FIG. 15 compares the stability of emulsions formed by Example 9, different low concentrations (0.001-0.01 wt %) of an aqueous solution of polymer coated iron oxide nanoparticles (PSS-co-$MA_{5000}$), a salt solution of polymer coated iron oxide nanoparticles (0.2 M $CaCl_2$)), an aqueous solution of polymer coated iron oxide nanoparticles stabilized nanodroplets, and a salt solution of nanodroplets (0.2 M $CaCl_2$)) after storage for 38 days at ambient temperature. Compared with polymer-coated iron oxide nanoparticles, the stable emulsion can be synthesized with the nanoparticle concentration of 0.002-0.01 wt % in the salt solution of the nanodroplet, and the upper emulsion synthesized at this concentration has uniform texture without obvious demulsification. The upper layer emulsion formed by the aqueous solution of nanodroplets is stable at the nanoparticle concentration of 0.004-0.01 wt %. However, the stable emulsion of nanoparticle aqueous solution or salt solution under this concentration condition has obvious demulsification phenomenon, and the upper layer emulsion formed by different concentrations of nanoparticle aqueous solution has shown the phenomenon of oil-water separation, and the nanoparticle mainly exists in the lower aqueous solution; whereas the emulsions formed by the nanoparticle salt solutions with different concentrations had obvious demulsification, and the emulsion showed the brown color of iron oxide nanoparticles, and the texture was obviously uneven.

Figure 16:
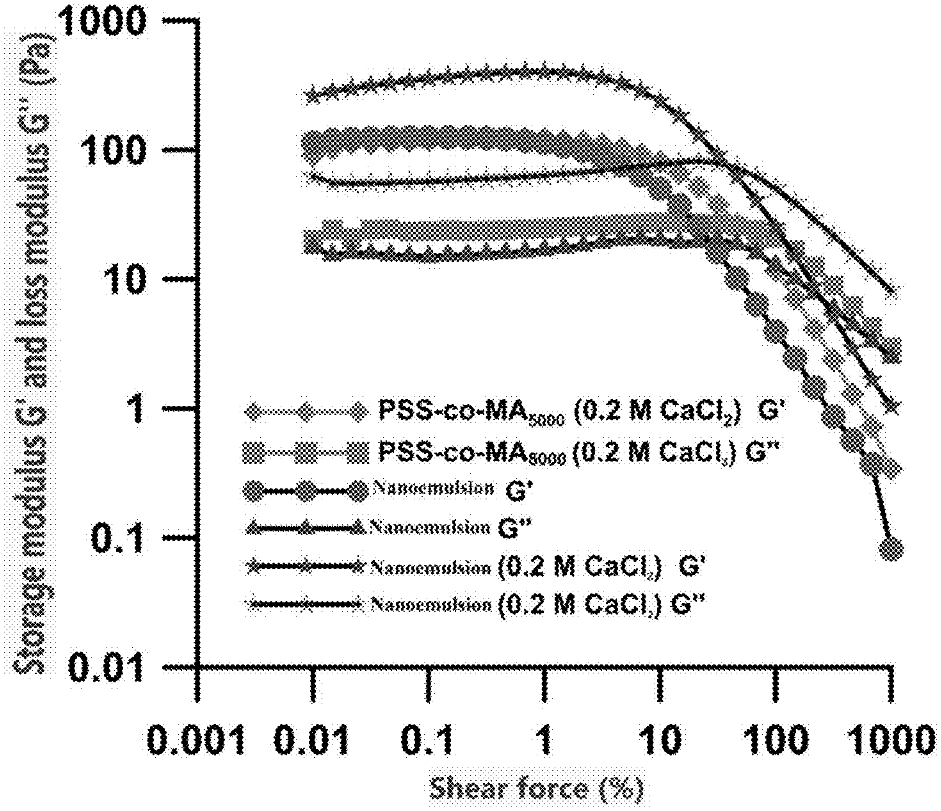
FIG. 16 shows rheological data for emulsions formed by Example 9, the polymer PSS-co-MA coated iron oxide nanoparticles (PSS-co-MA5000) salt solution (0.2 M $CaCl_2$)), nanodroplet aqueous solution, nanodroplet salt solution (0.2 $MCaCl_2$).

FIG. 16 shows rheological data for emulsions formed by Example 9, polymer PSS-co-MA coated iron oxide nanoparticles (PSS-co-$MA_{5000}$) salt solution (0.2 M $CaCl_2$)), nanodroplet aqueous solution, nanodroplet salt solution (0.2 M $CaCl_2$)). The storage modulus G' of all nanoparticle or nanodroplet synthetic emulsions is greater than the loss modulus G", indicating that all the synthesized emulsions can form gel-like structures. In addition, the storage modulus G' and the loss modulus G" of the emulsion formed in the nanodroplet salt solution are both larger than the emulsion formed by the nanoparticle salt solution alone, indicating that the nanodroplet is a superior emulsifier than the nanoparticle alone.

Figure 17:
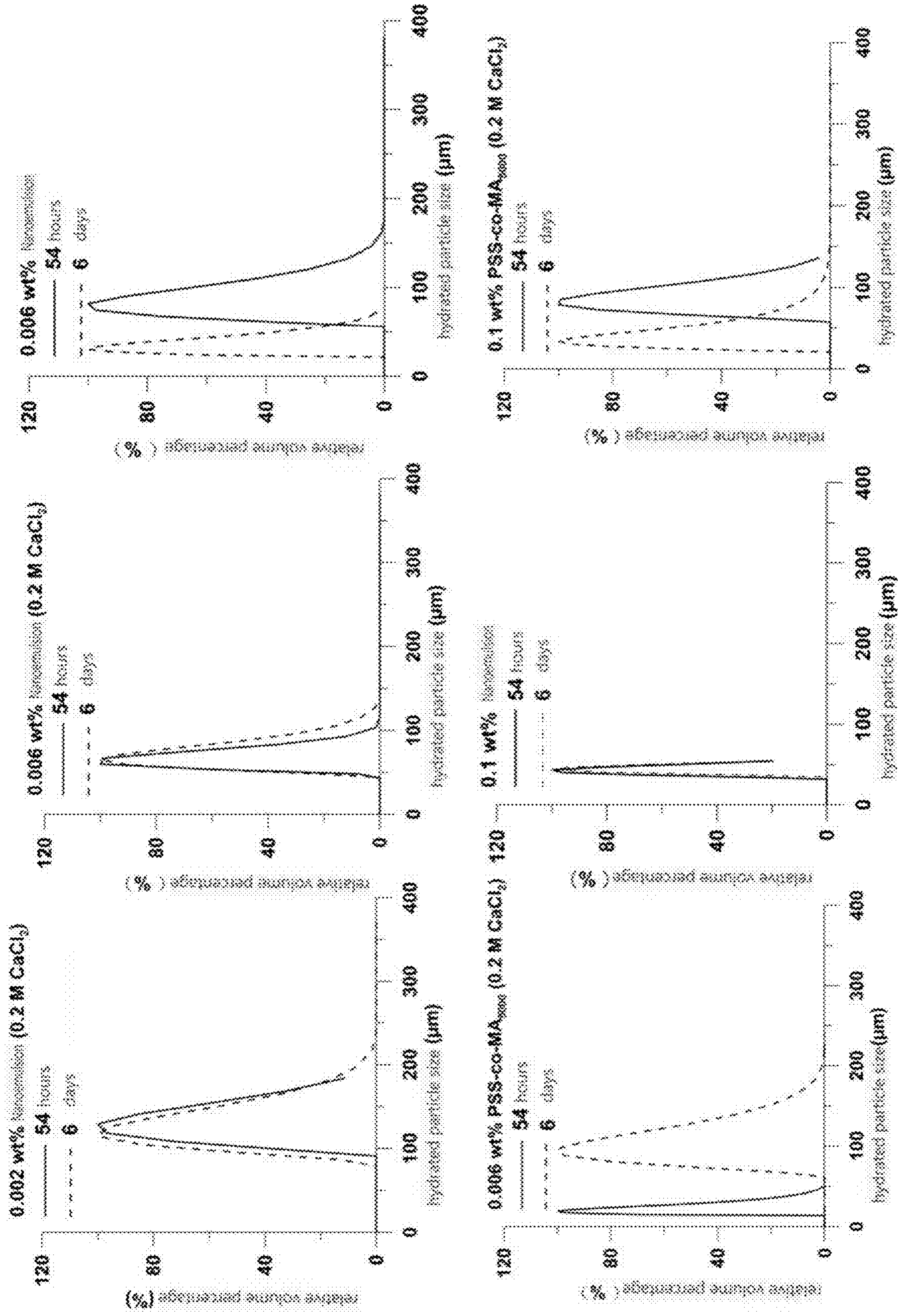
FIG. 17 compares the changes in the hydrated particle size of different emulsions synthesized by the polymer PSS-co-MA coated iron oxide nanoparticles (PSS-co-MA5000) salt solution (0.2 M $CaCl_2$)), nanodroplet aqueous solution, and nanodroplet salt solution (0.2 M $CaCl_2$)) in Example 9 stored for 56 hours and 6 days.

FIG. 17 compares the changes in the hydrated particle size of different emulsions synthesized by the polymer PSS-co-MA coated iron oxide nanoparticles (PSS-co-$MA_{5000}$) salt solution (0.2 M $CaCl_2$)), nanodroplet aqueous solution, and nanodroplet salt solution (0.2 M $CaCl_2$)) in Example 9 stored for 56 hours and 6 days. The results showed that the nanodroplet salt solution at very low concentrations (0.002 wt % and 0.006 wt %) could stabilize the emulsion well, so that the relative volume percentage of the hydrated particle size of the emulsion did not change significantly within 6 days. However, the emulsion synthesized by 0.006 wt % nanodroplet aqueous solution and nanoparticle salt solution has obvious hydration particle size change within 6 days, and the macro-emulsion can only be stabilized when the concentration of nanodroplet aqueous solution is increased to 0.1 wt %, which indicates that metallic calcium ions are also good synergistic stabilizers and play a crucial role in the preparation of stable emulsions using nanodroplet salt solutions. However, even if the concentration of the polymer-coated iron oxide nanoparticles salt solution increased to 0.1 wt %, the macro-emulsion could not be stabilized well, and the hydrated particle size changed significantly between 56 hours and 6 days.

Figure 18:
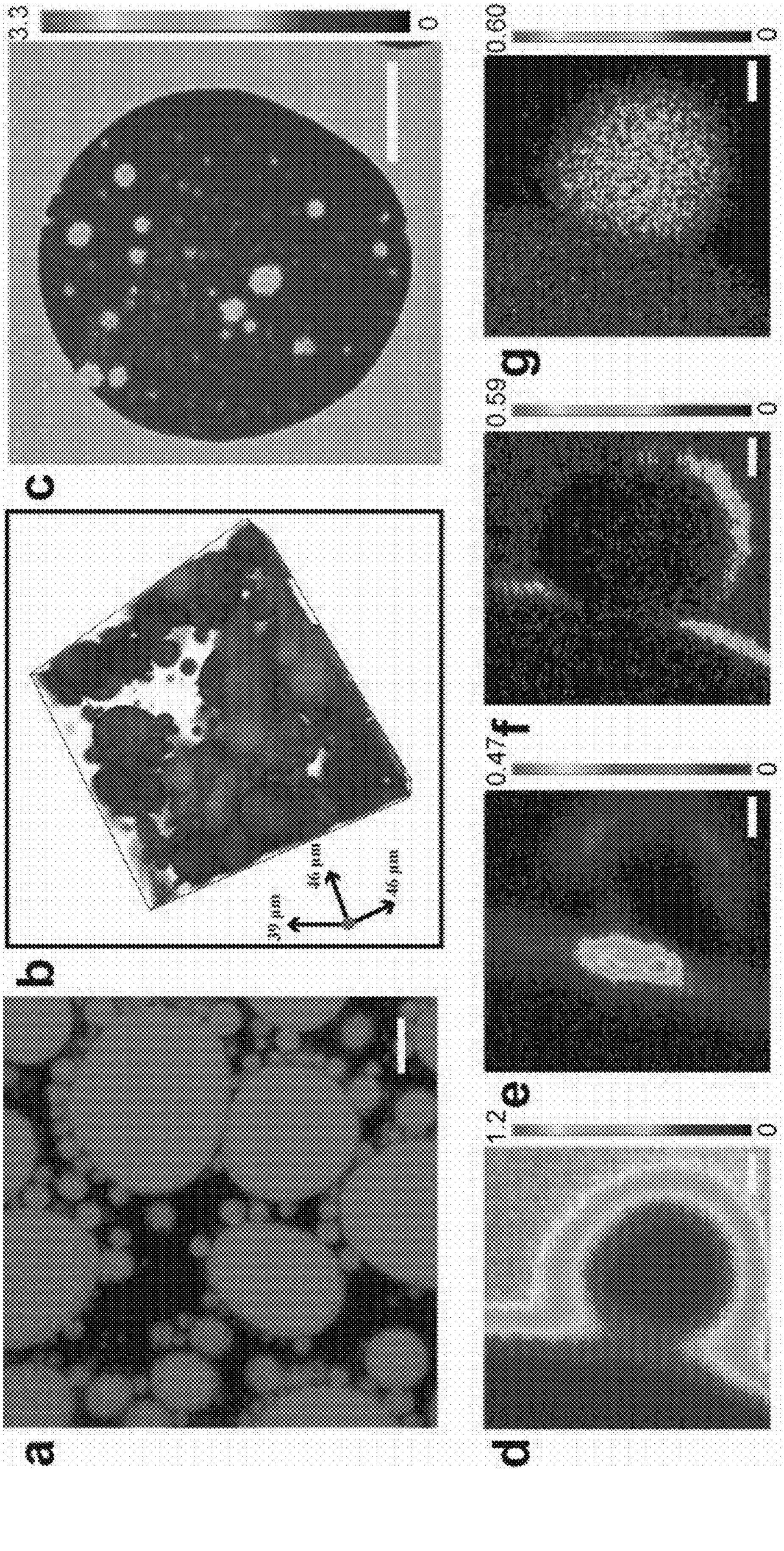
FIG. 18 shows the microstructure of the emulsion prepared in Example 9 with 0.01 wt % nanodroplet salt solution (0.2 M $CaCl_2$)).

FIG. 18 shows the microstructure of the emulsion prepared in Example 9 with 0.01 wt % nanodroplet salt solution (0.2 M $CaCl_2$)). (a-b) 2D and 3D confocal images of the emulsion (scale bar 5 μm) show that nanodroplets react with the oil to form larger nanodroplets and microdroplets (736 nm-3.4 μm in diameter) covering the surface of the emulsion, thereby greatly enhancing the specific surface area of the emulsion. In addition, nanodroplets with a diameter of about 200 nm can also be seen on the surface of microdroplets, indicating that the microdroplets covering the surface of the emulsion are also stabilized by nanodroplets; (c) the oxygen-edge X-ray scanning transmission microscopy imaging of the emulsion also shows that nanodroplets and microdroplets with larger particle sizes cover the surface of the emulsion, and there are obvious oil-water interface (high oxygen content) between nanodroplets and micro-oil droplets as well as large oil droplets in the emulsion; and (d-g) X-ray scanning transmission electron microscopy images of the oxygen edge, iron edge, calcium edge and benzene ring edge of the interface structure between the nanodroplet and the emulsion large oil droplet, respectively, and it is found that there are high contents of oxygen, iron, calcium and benzene ring in the interface between the nanodroplets and the emulsion large oil droplets, indicating that the polymer-coated iron oxide nanoparticles with calcium ions are the bridge connecting the nanodroplets, the nanodroplets and the emulsion large oil droplets.

Figure 19:
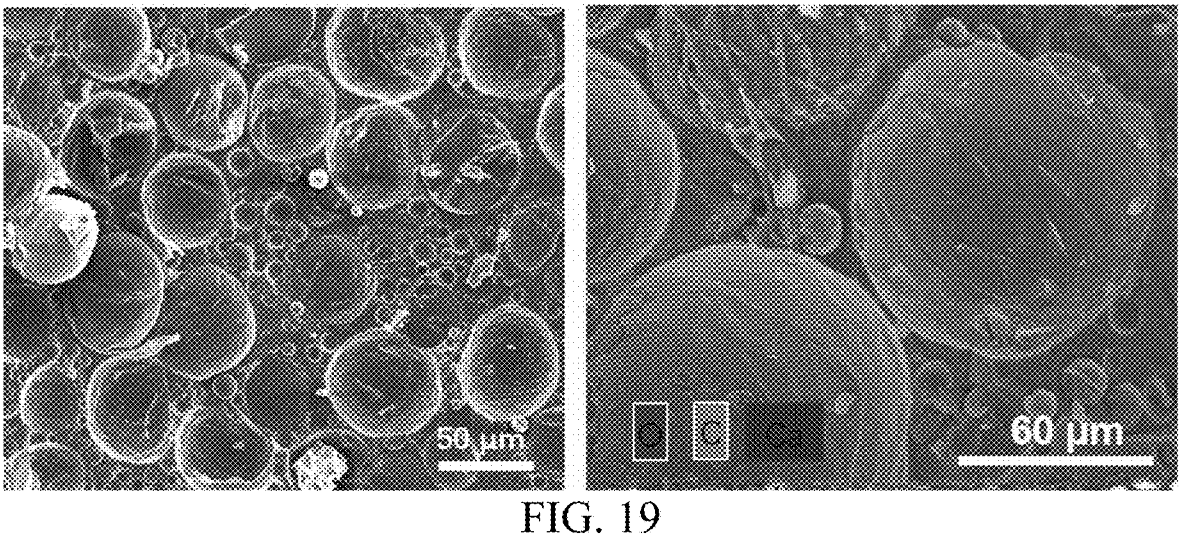
FIG. 19 shows the low-temperature scanning electron microscopy and energy dispersive spectroscopy (EDX) analysis images of the emulsion prepared from nanodroplet salt solution (0.2 M $CaCl_2$)) prepared by Example 9.

FIG. 19 shows the low-temperature scanning electron microscopy and energy spectrum (EDX) analysis images of the emulsion prepared by the nanodroplet salt solution (0.2 M $CaCl_2$)) prepared by Example 9, indicating that many calcium elements and iron elements accumulate at the interface, and calcium ions is a synergistic stabilizer that forms a shell around the entire emulsion oil droplet.

Figure 20:
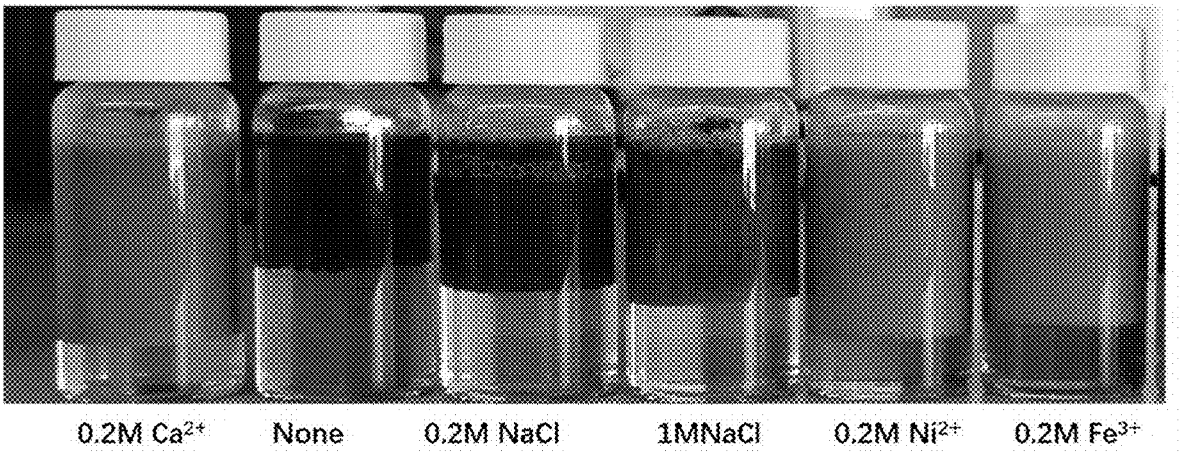
FIG. 20 shows the oil-in-water emulsions prepared by Example 9 and Example 10 containing different metal cations.
Figure 21:
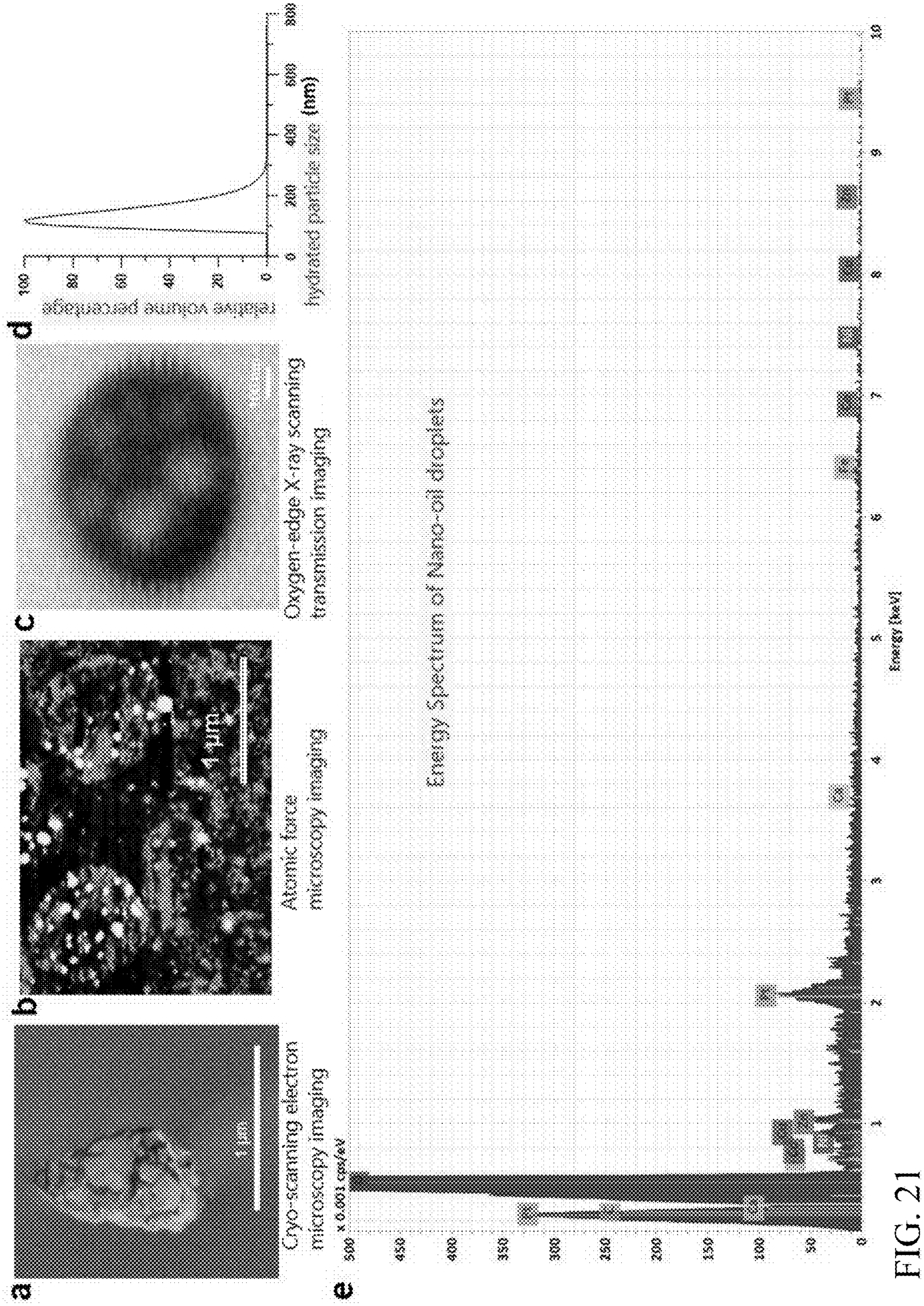
FIG. 21 shows cryo-scanning electron microscopy (a), atomic force microscopy (b), (c) oxygen-edge X-ray scanning transmission microscopy images, (d) hydrated particle size distribution and (e, f) energy spectrum of the composite nano-emulsion prepared by Example 5.
Figure 21:
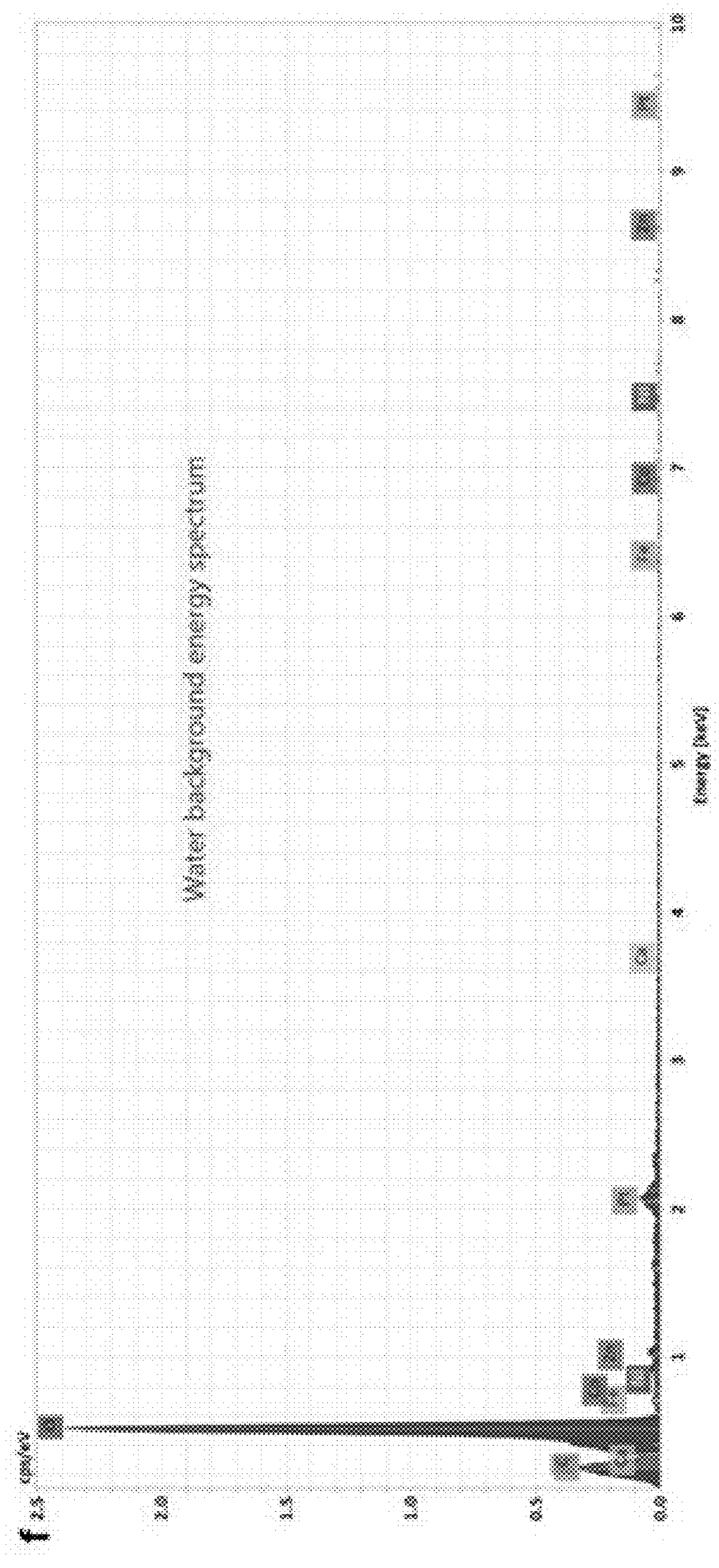
Figure 22:
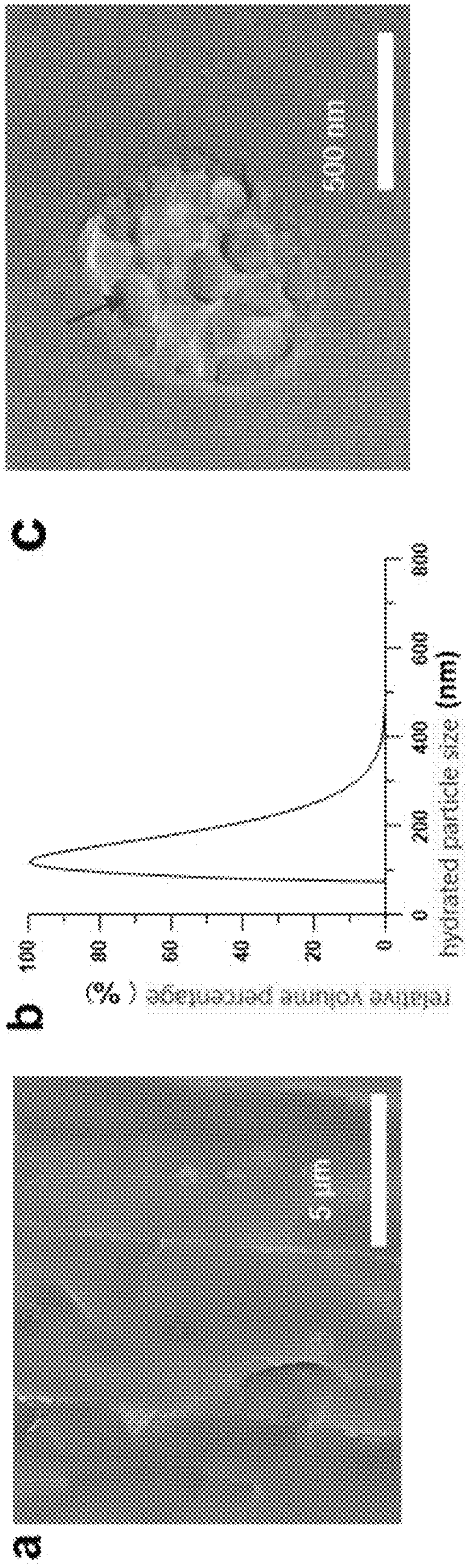
FIG. 22 shows the cryo-canning electron microscopy image (a, c), size distribution (b), energy spectrum (d), atomic force microscope (e) and oxygen edge, iron edge, and benzene ring edge X-ray scanning transmission X-ray microscope images (f-h) of the composite nano-emulsion prepared by Example 6.
Figure 22:
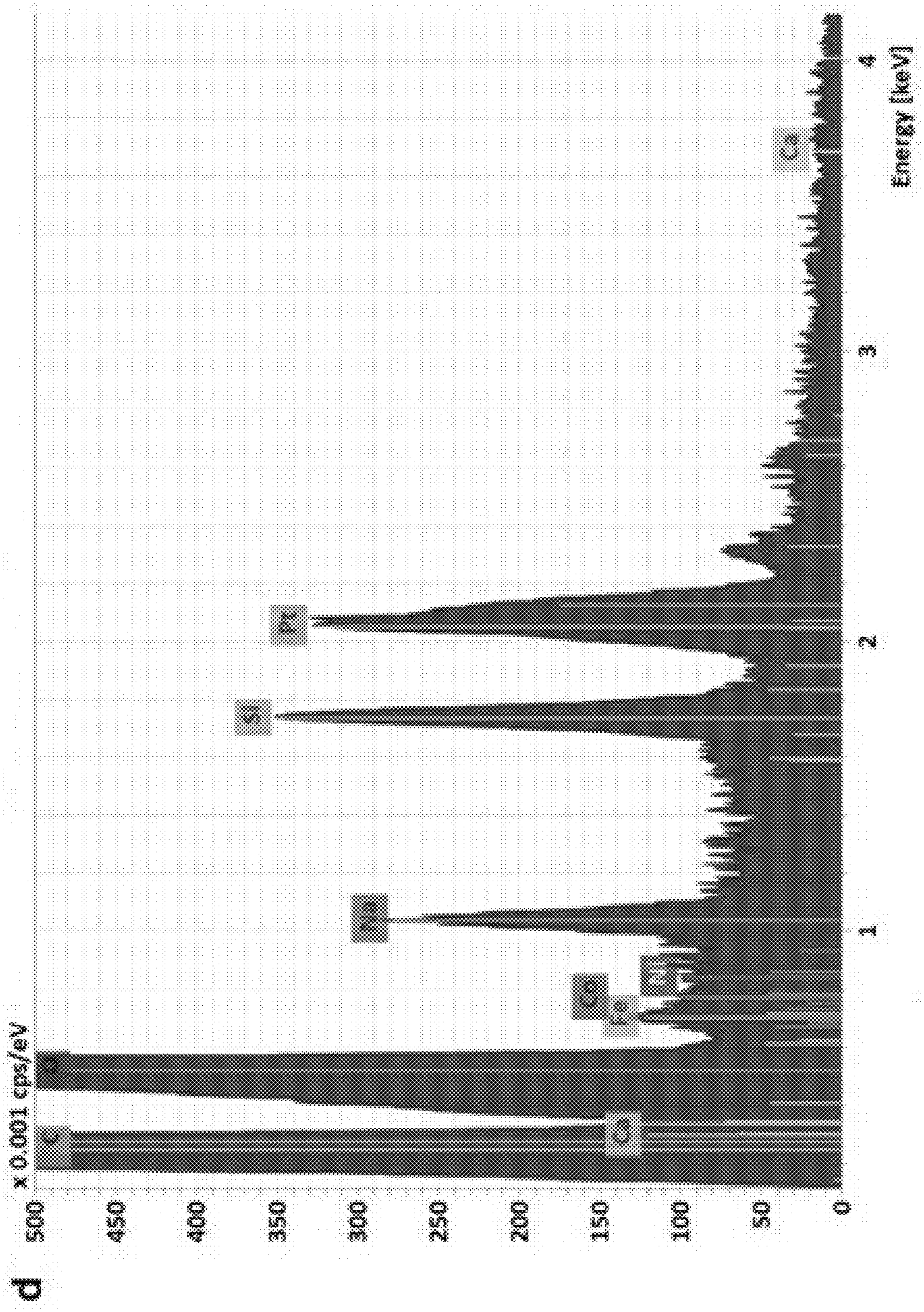
Figure 22:
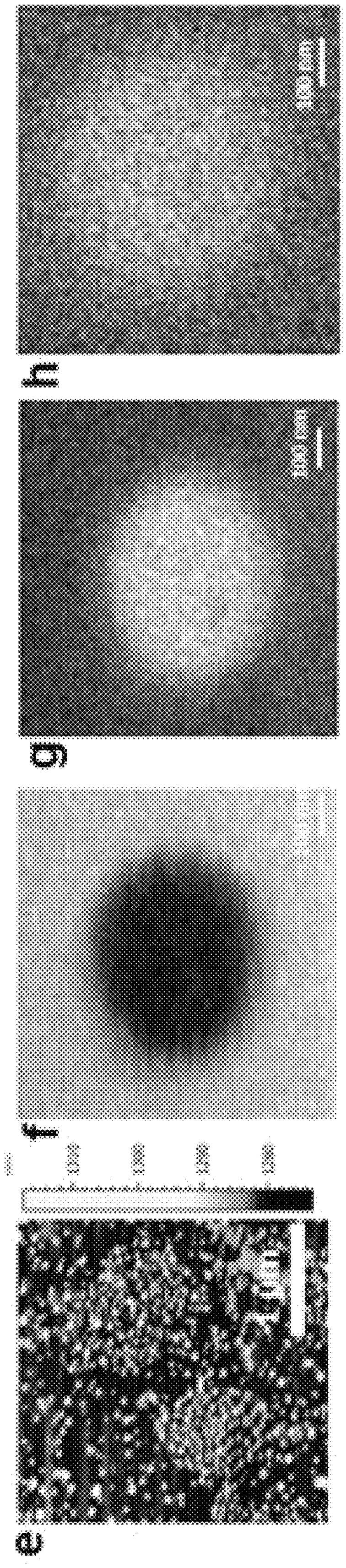
Figure 23:
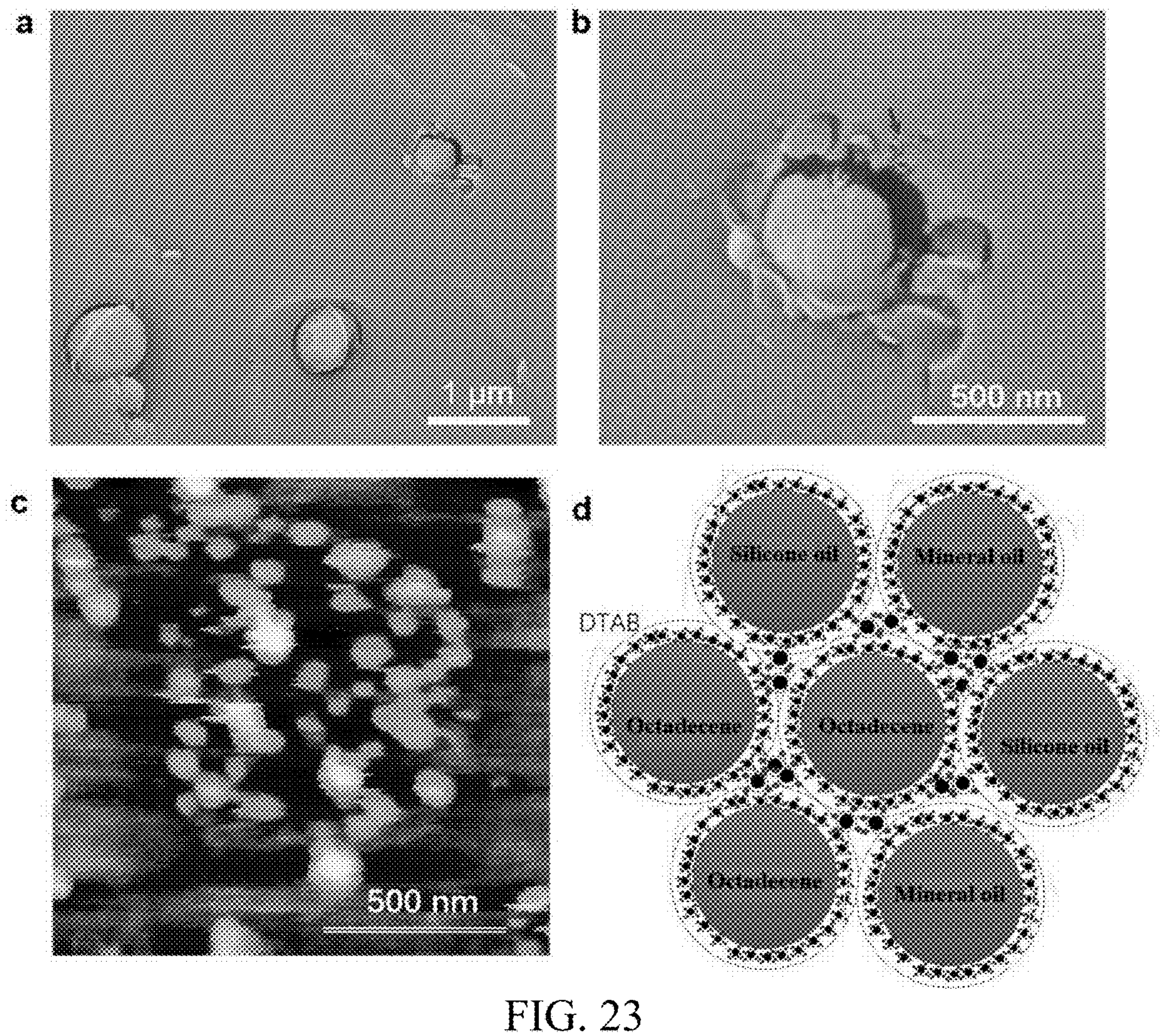
FIG. 23 shows (a, b) cryo-scanning electron microscopy images, (c) atomic force microscopy images and (d) schematic diagram of the oil-in-water composite nano-emulsion containing multiple oil components, multiple metal ions, and a cationic surfactant, prepared by example 7.

FIG. 20 shows that the stable oil-in-water emulsion prepared by Example 9 and Example 10 (high concentration of $Na^+$, $Ni^{2+}$, $Co^{2+}$ and $Fe^{3+}$) can also be prepared by nano-emulsion with other monovalent, divalent and trivalent metal ions.

Example 10

A macro-emulsion was prepared according to the same operation and conditions as in Example 9, with the complexation of the nano-emulsion prepared in Example 4 and $CaCl_2$) (the concentration of $CaCl_2$) after complexation was 0.2M) as the stabilizer, except that the solution of 0.2M $CaCl_2$) was replaced by 0.2M NaCl, 1M NaCl, 0.2M $NiCl_2$, 0.2M $FeCl_3$, respectively.

Example 11

When a macro-emulsion is prepared according to the same operation and condition of Example 9, the difference is that the oil-in-water composite nano-emulsion containing single oil component and multiple metal ions prepared in Example 5 and $CaCl_2$) compounding ($CaCl_2$) concentration after compounding was 0.2 M) are used as stabilizers, and the concentration ratio of polymer PSS-co-MA coated iron oxide nanoparticles in the composite nano-emulsion is 0.0002 wt %, 0.0003 wt %, 0.0004 wt %, 0.0005 wt %.

Figure 25:
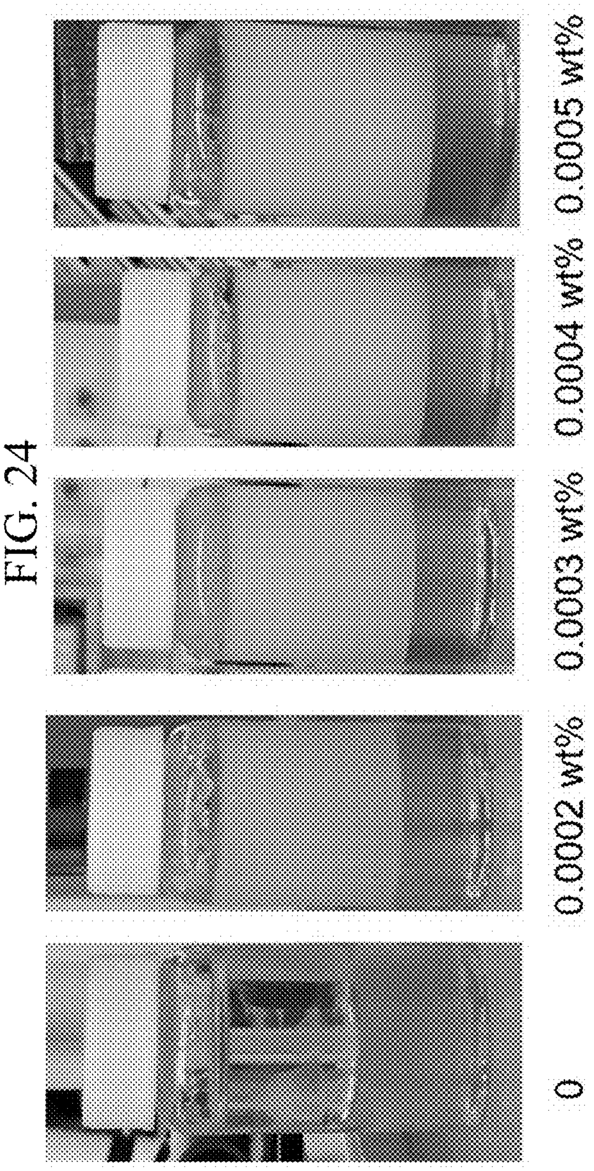
FIG. 25 shows the photographs prepared by Example 11, using different concentrations of oil-in-water composite nano-emulsions containing multiple oil components and various metal ions to synthesize emulsions after 48 hours.
Figure 26:
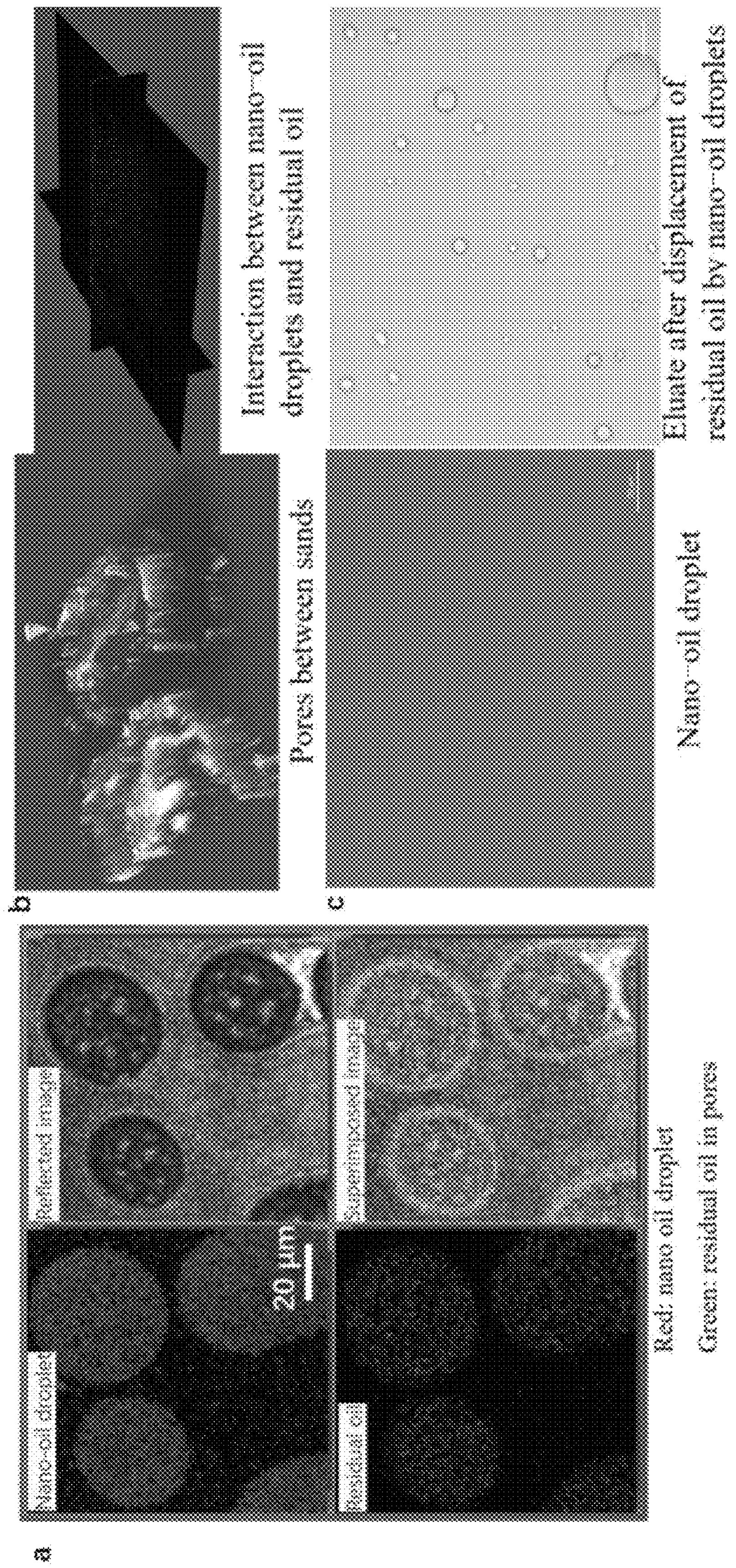
FIG. 26 shows the three-dimensional micromodel (b) and the macro-emulsion model (c) made by Example 12 using the laser confocal microscope and the two-dimensional displacement micromodel (a) and quartz sand.

FIG. 25 shows photographs of emulsions prepared by Example 11, synthesized with different concentrations of oil-in-water composite nano-emulsions containing multiple oil components and multiple metal ions, respectively, after 48 hours, and it was found that composite nano-emulsion needs a lower concentration of polymer-coated iron oxide nanoparticles to stabilize the emulsion than the simple nano-emulsion, and the lowest concentration could reach 0.0002 wt %.

Comparative Example 1. Non-Covalent Adsorption of Polymers on the Surface of Iron Oxide Nanoparticles by Using Ultrasonic Methods 300 ml of MiliQ water was poured into a 400 ml clean beaker and 12 g of PSS-co-MA polymer was dissolved in the water. Concentrated hydrochloric acid was added to adjust the pH of the polymer solution to 5. Stir with an appropriately sized stir bar for 10 minutes. Then 3 g of $Fe_3O_4$ particles (Research Nanomaterials, 20-30 nm) were added to the solution and sonicated for 60 min in an ice bath at the 50% amplitude setting. To remove aggregated nanoparticles, the sonicated solution was centrifuged at 4000 g for 20 min. Finally, the supernatant was concentrated and free aggregate was removed to 30 mg/mL for storage using a 100 kD protein enrichment tube (amicon Ultra-12,100 kDa). The iron content and polymer content in the nanoparticles were determined by inductively coupled plasma mass spectrometry (ICP-MS) and thermogravimetric analysis (TGA).

Example 12. Real-Time Observation of the Displacement Effect of Nano-Emulsion on Residual Oil Using a Microscopic Displacement System In order to observe the dynamic interaction between the nano-emulsion and oil without adding metal ions, the glass micromodel was first saturated with water using a syringe pump at an injection rate of 15 uL/min. Then 1-octadecene was injected into the micromodel at an injection rate of 5 ul/min until oil saturation was reached. The first water displacement was performed by injecting water at a rate of 5 microliters per minute until no more oil was produced in the effluent. A nano-emulsion with a single pore volume (concentration 0.01 wt %) was injected into the micromodel, and real-time imaging was performed with a laser confocal microscope to study the interaction between the nano-emulsion and residual oil and the oil recovery rate to evaluate the displacement effect of residual oil.

To observe the interaction of nano-emulsions with oil in a salt solution containing metal ions, the glass micromodel was first saturated with 0.2 M calcium chloride solution using a syringe pump at an injection rate of 15 μL/min. Then 1-octadecene was injected into the micromodel at an injection rate of 5 μL/min until synaptic water saturation conditions are reached. 0.2 M $CaCl_2$) solution was injected at a rate of 5 μl per min until no more oil is produced in the effluent. Nano-oil droplets at concentrations of 0.01 wt % and 0.2 m $CaCl_2$) were injected into the micro-model and the interaction and displacement effect of the nano-emulsion with residual oil was studied using confocal microscopy imaging.

FIGS. **26*a*-26*c*** show the dynamic display of the displacement effect of nano-emulsion on residual oil and dynamic interaction with oil by Example 12 using a laser confocal microscope and a two-dimensional displacement micromodel (a) and a three-dimensional micro-model made of quartz sand (b). The results show that the nano-emulsion can aggregate on the oil-water interface of the residual oil and displace the residual oil to form the microemulsion and macro-emulsion (c) with larger particle size.

The preferred embodiments of the present invention have been described in detail above. However, the present invention is not limited thereto. Within the scope of the technical concept of the present invention, various simple modifications can be made to the technical solution of the present invention, including the combination of various technical features in any other suitable manner, and these simple modifications and combinations should also be regarded as the disclosed content of the present invention and all belong to the protection scope of the present invention.

What is claimed is:

1. Polymer-coated nanoparticles, wherein the polymer self-assembles into a cage-shaped structure and coats the nanoparticles; and the nanoparticles are iron-containing metal; the polymer contains sulfonic acid groups and carboxyl groups, the sulfonic acid groups and the carboxyl groups can be completely or partially converted into salt forms, and the salts are potassium salts, sodium salts or ammonium salts, wherein the polymer is obtained by copolymerizing unsaturated monomers containing the sulfonic acid groups and unsaturated monomers containing the carboxyl groups; the unsaturated monomers containing the sulfonic acid groups comprise styrene sulfonate, methacryl sulfonate, propenyl sulfonate, vinyl sulfonate, butenyl sulfonate or 2-acrylamide-2-Methylpropanesulfonate; and the unsaturated monomers containing the carboxyl groups are selected from maleic acid, acrylic acid, methacrylic acid, crotonic acid, 2-ethylacrylic acid, 2-pentenoic acid, 4-pentene, 2-octenoic acid, 3-vinylbenzoic acid, 4-vinylbenzoic acid, 10-undecenoic acid, erucic acid, brassenoic acid, palmitoleic acid, oleic acid, nervonic acid, linolenic acid, ricinoleic acid, 4-oxo-4-phenyl-2-butenoic acid, 2-bromoacrylic acid, 2-bromomethyl-acrylic acid, sorbic acid, itaconic acid, citraconic acid, fumaric acid, methyl fumaric acid, mesaconic acid, 2-methylsuccinic acid acid, mucofuric acid.

2. The nanoparticles according to claim 1, wherein the polymer is a sodium salt of poly (4-styrenesulfonic acid-maleic acid copolymer), with the quantity ratio of sulfonate and carboxyl groups in the polymer being 1:2, and a molecular weight being 1.5-2 million.

3. The nanoparticles according to claim 1, wherein the chemical structure of the iron-containing metal oxides is $Fe_{(3-x)}M_xO_4$ ($0 \le x \le 3$) or $Fe_{(2-x)}M_xO_3$ ($0 \le x \le 2$), where M is selected from Mn, Cu, Zn, Ni, Gd or Co, and the size of the iron-containing metal oxides is 10-20 nm.

4. The nanoparticles according to claim 1, wherein there is one nanoparticle in the cage per polymer, and a single nanoparticle in the cage has 1,000-120,000 metal atoms; and the metal atom is iron.

5. A method for preparing nanoparticles according to claim 1, comprising the following steps: a) allowing a polymer to self-assemble to form a cage-shaped structure; b) adding metal salts and an oxidizing agent to grow nanoparticle crystals within a cavity of the cage-shaped structure formed by the polymer; optionally, a purification step (c) is also performed: concentrating the synthesized magnetic nanoparticles using protein enrichment tubes after centrifugation.

6. The preparation method according to claim 5, wherein the conditions for self-assembly of the polymer into the cage-shaped structure are: a salt concentration is 0.05-1M halide salt, a pH value is 5-8.5; a temperature is 50-60° C.; and a concentration of the polymer is 0.25-5 mg/mL.

7. The preparation method according to claim 5, wherein the metal salts comprise iron salts, optionally, a metal M salt can also be added, and the metal Mis selected from at least one of Mn, Cu, Zn, Ni, Gd, and Co; and the metal M salt is a halide salt.

8. The preparation method according to claim 5, wherein the metal oxide nanoparticles and the oxidizing agent are fed according to a molar ratio of the metal salt and the oxidizing agent of 2-3:1.

9. The preparation method according to claim 5, wherein the metal salt is added at a rate of 10-200 metal ions per polymer per minute in the system.

10. A composite nano-emulsion, comprising; a) a continuous phase; b) a discontinuous phase; c) a stabilizer; and d) metal ions, wherein the stabilizer comprises the polymer-coated nanoparticles according to claim 1.

11. The composite nano-emulsion according to claim 10, wherein the continuous phase is a polar solvent selected from water, alcohol and nitriles; and/or the discontinuous phase is an oil incompatible with the continuous phase selected from at least one of unsaturated fatty acid, mineral oil, fatty oil, and silicone oil;

where a ratio of discontinuous phase volume to continuous phase volume is from 0.15 to less than 1.

12. The composite nano-emulsion according to claim 10, wherein the stabilizer further comprises an anionic surfactant and a cationic surfactant.

13. The composite nano-emulsion according to claim 10, wherein the metal ion is a monovalent or multivalent ion selected from at least one of $Na^{+}$, $K^{+}$, $Ca^{2+}$, $Co^{2+}$, $Ni^{2+}$, $Ba^{2+}$, $Mg^{2+}$, $Al^{3+}$, and $Cu^{2+}$; and a concentration of the metal ions in the system is 0.1-0.3M.

14. The nanoparticles according to claim 3, wherein the iron-containing metal oxides are $Fe_3O_4$ or $Fe_{1.5}Co_{1.5}O_4$.

15. The composite nano-emulsion according to claim 10, wherein the polymer is a sodium salt of poly (4-styrenesulfonic acid-maleic acid copolymer), with the quantity ratio of sulfonate and carboxyl groups in the polymer being 1:2, and a molecular weight being 1.5-2 million.

* * * * *